United States Patent [19]

Mäusezahl

[11] Patent Number: 5,131,919
[45] Date of Patent: Jul. 21, 1992

[54] BLUE ANTHRAQUINONE DYE MIXTURE FOR NATURAL AND SYNTHETIC POLYAMIDES

[75] Inventor: Dieter Mäusezahl, Biel-Benken, Switzerland

[73] Assignee: Ciba-Geigy Corporation, Ardsley, N.Y.

[21] Appl. No.: 687,764

[22] Filed: Apr. 18, 1991

Related U.S. Application Data

[63] Continuation of Ser. No. 491,808, Mar. 8, 1990, abandoned.

[30] Foreign Application Priority Data

Mar. 10, 1989 [CH] Switzerland ............... 905/89

[51] Int. Cl.$^5$ ............... C09B 1/26; C09B 67/22; D06P 3/24
[52] U.S. Cl. ............... 8/643; 8/676; 8/678; 8/680; 8/683; 8/684; 8/917; 8/924
[58] Field of Search ............... 8/643, 676, 679

[56] References Cited

U.S. PATENT DOCUMENTS

| | | | |
|---|---|---|---|
| 3,778,453 | 12/1973 | Hindermann et al. | 548/528 |
| 3,842,102 | 10/1974 | Hindermann et al. | 548/542 |
| 3,859,283 | 1/1975 | Hindermann et al. | 546/204 |
| 4,260,389 | 4/1981 | Lister | 8/491 |
| 4,396,393 | 8/1983 | Schaetzer et al. | 8/643 |
| 4,402,704 | 9/1983 | Raisin et al. | 8/641 |
| 4,408,995 | 10/1983 | Guth et al. | 8/477 |
| 4,445,905 | 5/1984 | Schaetzer et al. | 8/641 |
| 4,514,187 | 4/1985 | Schutz et al. | 8/531 |

Primary Examiner—A. Lionel Clingman
Attorney, Agent, or Firm—Marla J. Mathias; Edward McC. Roberts

[57] ABSTRACT

The invention relates to a dye mixture containing a dye of the formula

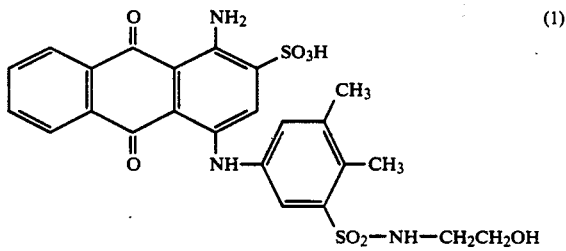

and a dye of the formula

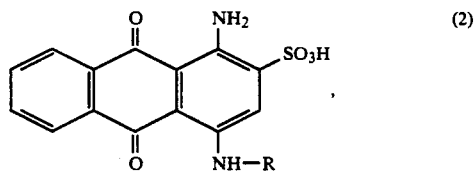

where R is cyclohexyl or phenyl, which may each be substituted by $C_1$-$C_4$ alkyl, acetylamino, N-$C_1$-$C_4$alkylacetylamino, benzoylamino, ureido or by phenylsulfonylamino or phenylsulfonyloxy which may be substituted in the phenyl ring by $C_1$-$C_4$alkyl.

Said dye mixture is suitable for dyeing and printing natural or synthetic polyamide materials, in particular in combination with other dyes and in particular from short liquors. The mixture is notable for generally good properties, in particular good dyeing properties and good solubility.

16 Claims, No Drawings

BLUE ANTHRAQUINONE DYE MIXTURE FOR NATURAL AND SYNTHETIC POLYAMIDES

This application is a continuation of application Ser. No. 491,808, filed Mar. 8, 1990, now abandoned.

It is an object of the present invention to provide anthraquinone dyes or dye mixtures which are suitable for dyeing natural and synthetic polyamide materials from an aqueous bath, which have very good fastness properties, in particular light fastness properties, and which, in particular if combined with other dyes, have good dyeing characteristics, in particular from short liquors.

This object is achieved by a mixture of the dyes of the formulae (1) and (2).

The present invention accordingly provides a dye mixture containing a dye of the formula

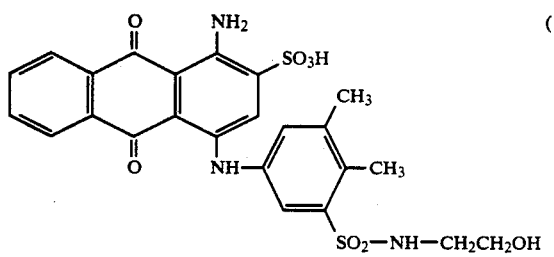

and a dye of the formula

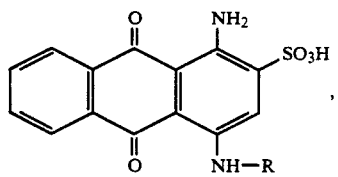

where R is cyclohexyl or phenyl, which may each be substituted by $C_1$–$C_4$alkyl, acetylamino, N-$C_1$-$C_4$alkylacetylamino, benzoylamino, ureido or by phenylsulfonylamino or phenylsulfonyloxy which may each be substituted in the phenyl ring by $C_1$–$C_4$alkyl.

The dye mixture according to the present invention thus may contain a dye of the formula (1) and one of the dyes of the formula (2).

Possible $C_1$–$C_4$alkyl substituents for R in the formula (2) are methyl, ethyl, propyl, isopropyl, butyl, isobutyl, sec-butyl and tert-butyl.

Possible N-$C_1$-$C_4$alkylacetylamino substituents for R in the formula (2) are for example N-methyl-, N-ethyl-, N-propyl-, N-isopropyl-, N-butyl- and N-isobutylacetylamino.

Preference is given to a dye mixture which contains a dye of the formula (1) and a dye of the formula (2) where R is cyclohexyl, phenyl, 2-methylphenyl, 2,4,6-trimethylphenyl, 3- or 4-acetylaminophenyl, 3-acetylamino-4-methylphenyl, 4-(N-methylacetylamino)phenyl, 3-ureidophenyl, 4-benzoylaminophenyl, 3-phenylsulfonylaminophenyl, 2-methyl-5-(4'-methylphenylsulfonylamino)phenyl or 4-(4'-methylphenylsulfonyloxy)phenyl.

Particular preference is given to a dye mixture which contains a dye of the formula (1) and a dye of the formula

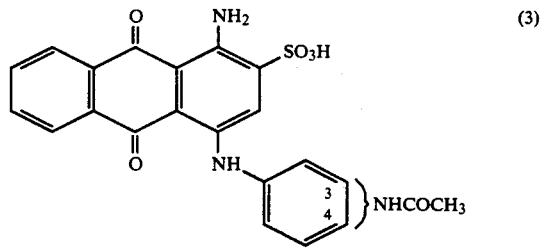

where the acetylamino group is bonded to the benzene ring in the 3- or 4-position.

The particularly preferred dye mixture according to the present invention may thus contain a dye of the formula (1) and a dye of the formula

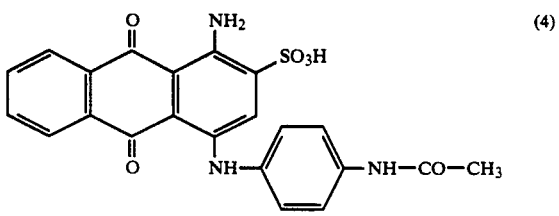

or a dye of the formula (1) and a dye of the formula

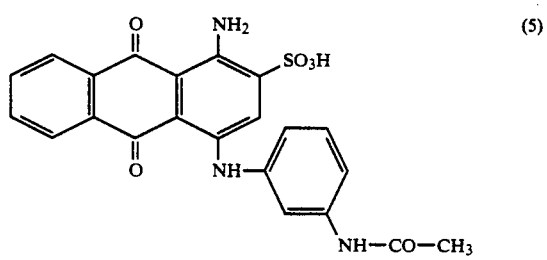

In the dye mixtures according to the present invention, the ratio of the dyes of the formulae (1) and (2) or (1) and (3) is preferably from 95:5 to 5:95, in particular from 80:20 to 20:80, especially from 60:40 to 40:60. For the dyes of the formulae (1) and (4) and (1) and (5) the ratio is particularly preferably from 60:40 to 40:60.

The anthraquinone dyes of the formulae (1), (2), (4) and (5) are known or can be prepared by similar methods as known dyes; for instance, the dye of the formula (1) can be prepared as described in U.S. Pat. No. 3,778,453 and the dye of the formula (4) as described in German Patent 945,643. The dye of the formula (5) can be prepared by a method similar to that described in German Patent 538,310.

The dye mixture according to the present invention can be prepared by mixing the individual dyes. This process of mixing is carried out for example in suitable mills, e.g. ball and pinned disc mills, but also in kneaders or mixers.

The dye mixture according to the present invention can also be prepared by mixed synthesis, for example by reacting 1-amino-4-bromoanthraquinone-2-sulfonic acid with 4,5-dimethyl-3-β-hydroxyethylaminosulfonylaniline and a compound of the formula $NH_2$-R, where R is as defined under the formula (2). Examples of compounds of the formula $NH_2$-R are 3- and 4-acetylaminoaniline. The reaction is carried out for example in the presence of water, an alcohol such as methanol, a base, such as sodium hydrogencarbonate, and a catalyst, such as a copper salt. Examples are copper halides such as CuCl.

The present invention further provides a process for dyeing and printing natural or synthetic polyamide materials with a dye mixture which contains dyes of the formulae (1) and (2). Suitable synthetic polyamide materials are for example nylon-6 and nylon-6.6 materials, and a suitable natural polyamide material is for example wool. The dyeing and printing is carried out using the usual dyeing and printing methods.

The dye mixture according to the present invention is particularly suitable for dyeing from short liquors, for example in continuous dyeing processes or in batchwise or continuous foam dyeing processes.

The dye mixture according to the present invention generally has good properties such as good solubility, cold solution stability, good dyeing characteristics and in particular good compatibility with other dyes.

In the dye mixture according to the present invention, the dyes of the formulae (1) and (2) are present either in the form of their free sulfonic acid or preferably as the salts thereof such as the alkali metal, alkaline earth metal or ammonium salts or as salts of an organic amine. Examples are the sodium, lithium and ammonium salts and the salt of triethanolamine.

The dye mixture generally contains further additions such as sodium chloride, dispersants or dextrin.

The dyeing liquors or print pastes may likewise contain further additions, for example wetting agents, antifoams, levelling agents or agents which affect the properties of the textile material, for example softeners, flame retardants, soil, water or oil repellants, water softeners and natural or synthetic thickeners, e.g. alginates and cellulose ethers.

The mixture of the dyes of the formulae (1) and (2) is suitable in particular for dyeing and printing in combination with other dyes, in particular for trichromatic dyeing and printing. Trichromatic is here understood as meaning the additive colour mixing of suitably selected yellow-, red- and blue-dyeing dyes in the amounts necessary to obtain the desired shade.

The present invention further provides a process for trichromatic dyeing or printing with a dye mixture which contains the dyes of the formulae (1) and (2) in combination with at least one red-dyeing dye and at least one yellow- or orange-dyeing dye, the mixture of the dyes of the formulae (1) and (2) according to the present invention being subject to the abovementioned preferences.

Preference is given to using in the trichromatic dyeing or printing process according to the present invention a mixture of dyes of the formulae (1) and (2) in combination with at least one red-dyeing dye of the formulae (6), (7) or (8):

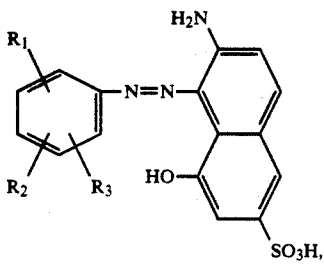

(6)

where $R_1$ is substituted or unsubstituted $C_1$-$C_8$alkyl, halogen, phenyl- or phenoxy-sulfonyl which may be substituted in the phenyl ring by $C_1$-$C_4$alkyl, cyclohexyloxycarbonylamino, $C_2$-$C_4$alkanoylamino, benzoylamino which may be substituted in the phenyl ring by halogen, 1-azacycloheptane-N-sulfonyl or

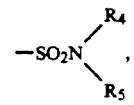

where $R_4$ is $C_1$-$C_8$alkyl or unsubstituted or $C_1$-$C_4$alkyl-substituted phenyl or cyclohexyl and $R_5$ is hydrogen or $C_1$-$C_8$alkyl, $R_2$ is hydrogen, halogen, $C_1$-$C_8$alkyl or $C_2$-$C_4$alkanoylamino, and $R_3$ is hydrogen or halogen,

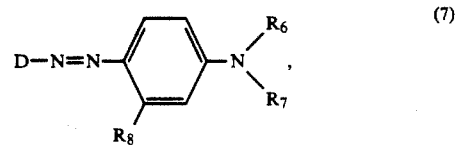

(7)

where D is substituted or unsubstituted phenyl, thiophenyl or benzothiazolyl, $R_6$ is $C_1$-$C_8$alkyl, $R_7$ is substituted or unsubstituted $C_1$-$C_8$alkyl and $R_8$ is hydrogen or $C_1$-$C_4$alkyl, or

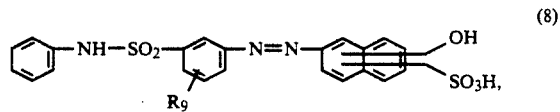

(8)

where $R_9$ is $C_1$-$C_4$alkyl, and in combination with at least one yellow- or orange-dyeing dye of the formula (9), (10), (11), (12) or (13):

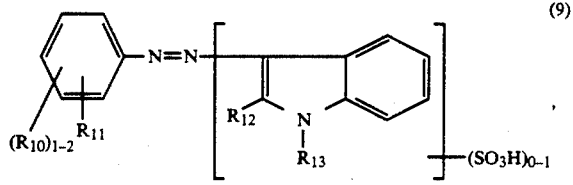

(9)

where $R_{10}$ is hydrogen, $C_1$-$C_4$alkyl, $C_1$-$C_4$alkoxy, halogen, $C_2$-$C_4$alkanoylamino or a substituted or unsubstituted arylsulfonyl, aryloxy or arylcarbonyl radical, $R_{11}$ is hydrogen, halogen, a substituted or unsubstituted alkyl, aryloxy or aryloxysulfonyl radical or a radical of the formula

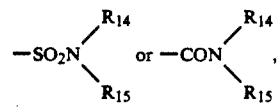

$R_{12}$ is a substituted or unsubstituted alkyl or aryl radical, $R_{13}$ is hydrogen or alkyl and $R_{14}$ and $R_{15}$ are independently of each other hydrogen or a substituted or unsubstituted alkyl, cycloalkyl or aryl radical, the dye of the formula (9) preferably containing only one radical $R_{10}$,

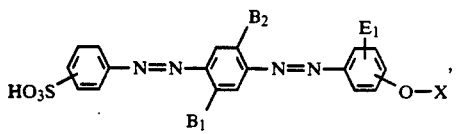

where $B_1$, $B_2$ and $E_1$ are each hydrogen, $C_{1-4}$alkyl, $C_{1-4}$alkoxy or $C_{2-4}$hydroxyalkoxy and X is straight-chain or branched $C_{1-4}$alkyl or straight-chain or branched $C_{2-4}$hydroxyalkyl,

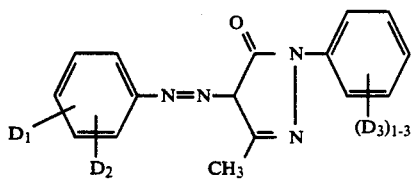

where $D_1$ is sulfo or has the meaning defined for $R_{10}$ in the formula (9), $D_2$ has the meaning defined for $R_{11}$ in the formula (9), $(D_3)_{1-3}$ is 1-3 substituents $D_3$, and $D_3$ is hydrogen, halogen, $C_{1-4}$alkyl, $C_{1-4}$alkoxy or sulfo,

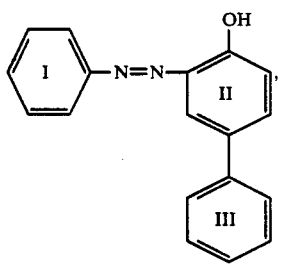

where the benzene rings I, II and III may be substituted, or

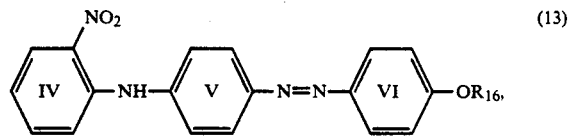

where the benzene rings IV, V and VI may be substituted and $R_{16}$ is hydrogen or arylsulfonyl, the mixture of the dyes of the formulae (1) and (2) according to the present invention being subject to the abovementioned preferences.

$C_1$-$C_8$Alkyl $R_1$, $R_2$, $R_4$ or $R_5$ in the formula (6) and $R_6$ or $R_7$ in the formula (7) is independently of the others for example methyl, ethyl, propyl, isopropyl, butyl, sec-butyl, tert-butyl, isobutyl, pentyl, hexyl, heptyl or octyl. Preferably, $R_1$, $R_2$, $R_4$, $R_5$, $R_6$ and $R_7$ are each $C_1$-$C_4$alkyl.

A $C_1$-$C_8$alkyl $R_1$ in the formula (6) can be substituted, for example by halogen, such as chlorine or bromine or in particular fluorine. An example is trifluoromethyl.

A $C_1$-$C_8$alkyl $R_7$ in the formula (7) can be substituted for example by sulfo, sulfato or phenyl. Examples are benzyl, β-sulfoethyl, γ-sulfopropyl and β-sulfatoethyl.

A halogen $R_1$, $R_2$ or $R_3$ in the formula (6) is independently of the others for example fluorine, bromine or in particular chlorine.

A benzoylamino $R_1$ in the formula (6) can be substituted in the phenyl ring by halogen, e.g. fluorine, bromine or in particular chlorine.

A phenyl or cyclohexyl radical $R_4$ and a phenylsulfonyl or phenoxysulfonyl $R_1$ can be substituted by $C_1$-$C_4$alkyl, e.g. methyl, ethyl, propyl, isopropyl, butyl, sec-butyl, tert-butyl or isobutyl, but in particular methyl.

A $C_1$-$C_4$alkyl $R_8$ in the formula (7) or $R_9$ in the formula (8) is independently of the other for example methyl, ethyl, propyl, isopropyl, butyl, sec-butyl, tert-butyl or isobutyl, but in particular methyl.

A $C_2$-$C_4$-alkanoylamino $R_1$ or $R_2$ in the formula (6) is independently of the other for example acetylamino, propionylamino or butyrylamino.

D in the formula (7) can be substituted for example by halogen, such as fluorine, chlorine or bromine, $C_1$-$C_4$alkyl, such as methyl, ethyl, propyl, isopropyl, butyl, sec-butyl, tert-butyl or isobutyl, $C_1$-$C_4$alkoxy, for example methoxy, ethoxy, propoxy or butoxy, $C_1$-$C_4$alkoxycarbonyl, for example methoxycarbonyl or ethoxycarbonyl, sulfo or unsubstituted or sulfo-substituted (in the alkyl moiety) $C_1$-$C_4$alkylaminosulfonyl e.g. methylaminosulfonyl, ethylaminosulfonyl or β-sulfoethylaminosulfonyl.

A $C_{1-4}$alkyl $R_{10}$ in the dye of the formula (9) and $C_{1-4}$alkyls $D_1$ and $D_3$ in the dye of the formula (11) are each methyl, ethyl, n-propyl, isopropyl, n-butyl, sec-butyl, isobutyl or tert-butyl.

A $C_{1-4}$alkoxy $R_{10}$ in the dye of the formula (9) and $C_{1-4}$alkoxies $D_1$ and $D_3$ in the dye of the formula (11) are each methoxy, ethoxy, n-propoxy, isopropoxy, n-butoxy, sec-butoxy, isobutoxy or tert-butoxy.

A $C_{2-4}$alkanoylamino $R_{10}$ in the dye of the formula (9) and a $C_{2-4}$alkanoylamino $D_1$ in the dye of the formula (11) are each for example acetylamino, propionylamino or butyrylamino.

In a substituted or unsubstituted arylsulfonyl, aryloxy or arylcarbonyl radical $R_{10}$ in the dye of the formula (9) or $D_1$ in the dye of the formula (11), aryl is preferably a radical of the benzene or naphthalene series which may be further substituted, for example by $C_{1-4}$alkyl, such as methyl or ethyl, $C_{1-4}$alkoxy, such as methoxy or ethoxy, halogen, such as fluorine, chlorine or bromine, alkanoylamino of 1 to 6 carbon atoms, such as acetylamino, or hydroxyl.

Halogen $R_{10}$ or $R_{11}$ in the dye of the formula (9) or $D_1$, $D_2$ or $D_3$ in the dye of the formula (11) is for example fluorine, chlorine or bromine.

In a substituted or unsubstituted aryloxy or aryloxysulfonyl radical $R_{11}$ in the dye of the formula (9) or $D_2$ in the dye of the formula (11), aryl is a radical of the benzene or naphthalene series which may be further substituted, for example by $C_{1-4}$alkyl, such as methyl or ethyl, $C_{1-4}$alkoxy, such as methoxy or ethoxy, halogen, such as fluorine, chlorine or bromine, alkanoylamino of 1 to 6 carbon atoms, such as acetylamino, or hydroxyl.

Substituted or unsubstituted alkyl radicals $R_{11}$, $R_{12}$, $R_{14}$ and $R_{15}$ in the dye of the formula (9) and $D_2$ in the dye of the formula (11) are each independently of the others preferably straight-chain or branched $C_{1-12}$alkyl, in particular $C_{1-4}$alkyl, which may be further substituted, for example by halogen, such as fluorine, chlorine or bromine, hydroxyl, cyano, $C_{1-4}$alkoxy, such as methoxy or ethoxy, or alkanoyl of 1 to 6 carbon atoms, such as acetyl or propionyl, or benzoyl. An alkyl radical $R_{12}$ or $R_{14}$ can also be substituted by sulfo. Examples of alkyl $R_{11}$, $R_{12}$, $R_{14}$ and $R_{15}$ are: methyl, ethyl, propyl, isopropyl, butyl, sec-butyl, tert-butyl, isobutyl and trifluoromethyl.

Substituted or unsubstituted aryls $R_{12}$, $R_{14}$ and $R_{15}$ in the dye of the formula (9) each preferably belong independently of the others to the benzene or naphthalene series and may be further substituted, for example by $C_{1-4}$alkyl, such as methyl, $C_{1-4}$alkoxy, such as methoxy or ethoxy, halogen, such as fluorine, chlorine or bromine, trifluoromethyl, alkanoylamino of 1 to 6 carbon atoms, such as acetylamino, hydroxyl or carboxyl. Aryl $R_3$ can also be substituted by sulfo. In particular, aryl $R_{12}$, $R_{14}$ or $R_{15}$ is phenyl which may be substituted by methyl, trifluoromethyl or chlorine.

An alkyl $R_{13}$ in the dye of the formula (9) is preferably straight-chain or branched $C_{1-12}$alkyl, in particular $C_{1-8}$alkyl. Examples are: methyl, ethyl, propyl, isopropyl, butyl, sec-butyl, tert-butyl, isobutyl, 1-pentyl, 3-pentyl, 1-heptyl, 3-heptyl and 1-octyl.

Substituted or unsubstituted cycloalkyls $R_{14}$ and $R_{15}$ are preferably each, independently of the other, cycloalkyl having 5-, 6- or 7-membered rings which may be further substituted, for example by $C_{1-4}$alkyl, such as methyl. Cyclohexyl in particular comes into consideration.

Alkyls $B_1$, $B_2$, $E_1$ and X in the formula (10) are each independently of the others straight-chain or branched alkyl, e.g. methyl, ethyl, propyl, isopropyl, butyl, sec-butyl, isobutyl or tert-butyl.

Alkoxy $B_1$, $B_2$ or $E_1$ in the formula (10) is for example methoxy, ethoxy, propoxy, isopropoxy, butoxy, sec-butoxy, isobutoxy or tert-butoxy.

Hydroxyalkoxy $B_1$, $B_2$ or $E_1$ in the formula (10) is straight-chain or branched hydroxyalkyl, for example $\beta$-hydroxyethoxy, $\beta$-hydroxypropoxy, $\beta$-hydroxybutoxy or $\alpha$-ethyl-$\beta$-hydroxyethoxy.

A hydroxyalkyl X in the formula (10) is straight-chain or branched hydroxyalkyl, for example $\beta$-hydroxyethyl, $\beta$-hydroxypropyl, $\beta$-hydroxybutyl or $\alpha$-ethyl-$\beta$-hydroxyethyl.

Possible substituents for the benzene rings I, II, III, IV, V and VI in the dyes of the formulae (12) and (13) are for example alkyl groups of 1 to 8, preferably 1 to 4, carbon atoms, e.g. methyl, ethyl, propyl, isopropyl, butyl, isobutyl, sec-butyl, tert-butyl, hexyl or octyl, which may each be substituted by sulfo or sulfato, alkoxy groups of 1 to 8 carbon atoms, in particular 1 to 4 carbon atoms, e.g. methoxy, ethoxy, propoxy, isopropoxy or butoxy, which may each be substituted in the alkyl radical by sulfo or sulfato, acylamino groups such as alkanoylamino groups of 2 to 8 carbon atoms and alkoxycarbonylamino groups of 2 to 8 carbon atoms, e.g. acetylamino, propionylamino, methoxycarbonylamino or ethoxycarbonylamino, alkanoyl groups of 2 to 8, preferably 2 to 4, carbon atoms, e.g. acetyl, propionyl, butyryl or isobutyryl, $C_5$-$C_7$cycloalkylcarbonyl, e.g. cyclohexylcarbonyl, $C_5$-$C_7$cycloalkylcarbonyl which is substituted in the cycloalkyl ring by $C_1$-$C_4$alkyl, such as methyl, ethyl, propyl or butyl, by halogen, e.g. fluorine, chlorine or bromine, or by sulfo or sulfato, benzoyl, benzoyl which is substituted in the phenyl ring by $C_1$-$C_4$alkyl, such as methyl, ethyl, propyl or butyl, by halogen such as fluorine, chlorine or bromine, or by sulfo or sulfato, benzothiazole or benzoxazole which may each be substituted by $C_1$-$C_4$alkyl, halogen, sulfo or sulfato, benzoylamino, amino, mono- or dialkylamino of 1 to 8 carbon atoms in the alkyl moiety, phenylamino, alkoxycarbonyl of 1 to 8 carbon atoms in the alkoxy moiety, $C_5$-$C_7$cycloalkylaminosulfonyl, nitro, cyano, trifluoromethyl, halogen, such as fluorine, bromine or in particular chlorine, sulfamoyl, sulfamoyl which is monosubstituted or disubstituted on the nitrogen by $C_1$-$C_4$alkyl, $C_5$-$C_7$cycloalkyl or phenyl, carbamoyl, ureido, hydroxyl, $C_1$-$C_8$alkylsulfonyl, $C_1$-$C_8$alkylaminosulfonyl, $C_1$-$C_4$alkylsulfonylaminosulfonyl, phenylsulfonyl which may be substituted in the phenyl ring by $C_1$-$C_4$alkyl, halogen, e.g. fluorine, chlorine or bromine, sulfo or sulfato, carboxyl, sulfomethyl, sulfo, sulfato, thiosulfato, and also phenyl, naphthyl, phenoxy, phenoxysulfonyl and phenylaminosulfonyl, which phenyl or naphthyl radicals may each be further substituted by the abovementioned substituents.

An arylsulfonyl $R_{16}$ in the formula (13) is in particular a phenylsulfonyl which may be substituted as indicated above for the benzene rings I to VI.

In the trichromatic dyeing or printing process according to the present invention, preference is given to using at least one red-dyeing dye of the formula (6), (7) or (8), in a dye of the formula (6) $R_1$ being trifluoromethyl, chlorine, acetylamino, —SO$_2$N(n—C$_4$H$_9$)$_2$, phenoxysulfonyl, phenylsulfonyl, 1-azacycloheptane-N-sulfonyl, cyclohexyloxycarbonylamino, benzoylamino which may be substituted in the phenyl ring by chlorine, phenylaminosulfonyl which may be substituted in the phenyl ring by methyl, cyclohexylaminosulfonyl, N-($C_1$-$C_2$alkyl)phenyl-or N-($C_1$-$C_2$alkyl)cyclohexylaminosulfonyl, $R_2$ being hydrogen, methyl, chlorine or acetylamino and $R_3$ being hydrogen or chlorine, and in a dye of the formula (7) D being chlorine-, sulfo-, methylaminosulfonyl-, ethylaminosulfonyl- or $\beta$-sulfoethylaminosulfonyl-substituted phenyl, methyl-, methoxycarbonyl- or ethoxycarbonyl-substituted thiophenyl or unsubstituted or methyl-, methoxy- or sulfo-substituted benzothiophenyl, $R_6$ being ethyl, $R_7$ being ethyl, $\beta$-sulfatoethyl, —(CH$_2$)$_{2-3}$SO$_3$H or benzyl, and $R_8$ being hydrogen or methyl, and in a dye of the formula (8) $R_9$ being methyl.

Use is made in particular of at least one red-dyeing dye of the formula

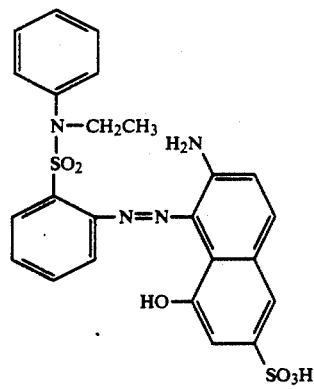

(14)

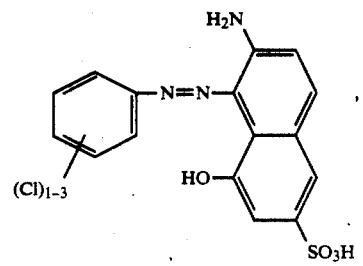

(15)

-continued
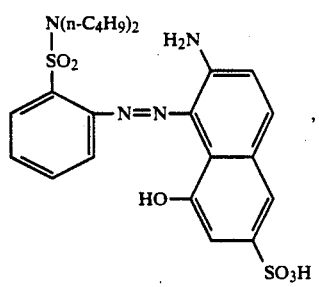
(16)
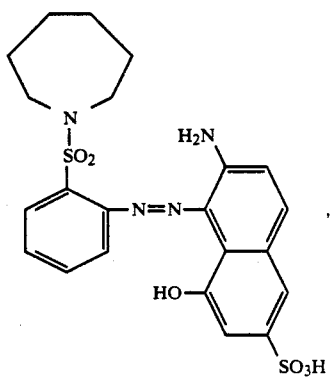
(17)
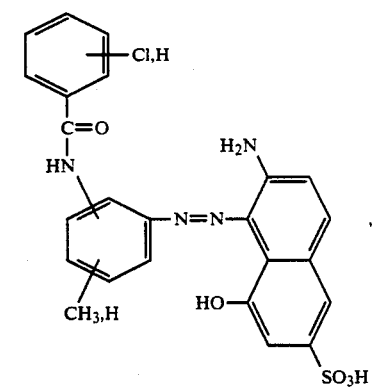
(18)
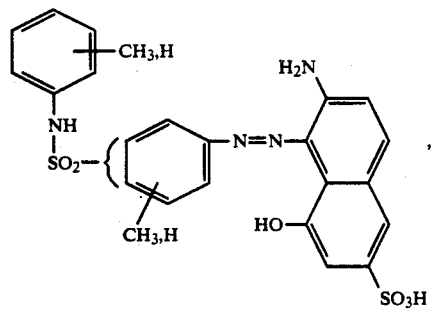
(19)
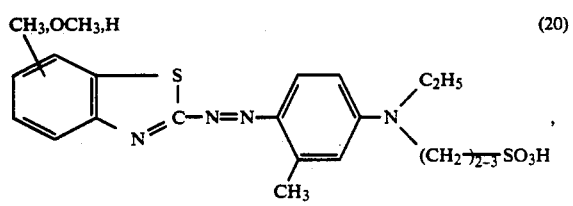
(20)
-continued
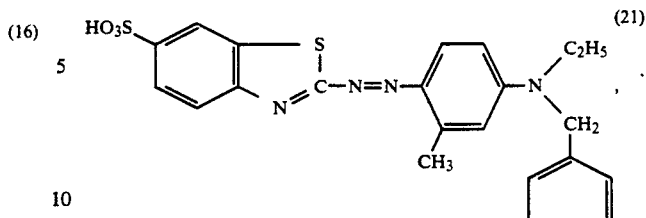
(21)
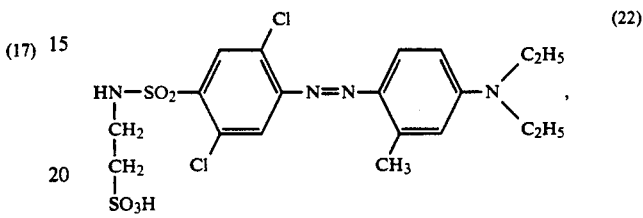
(22)
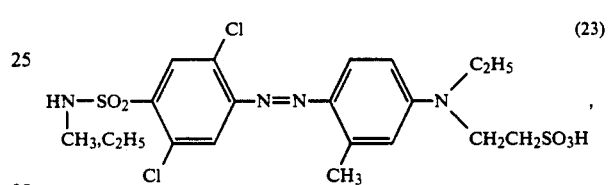
(23)
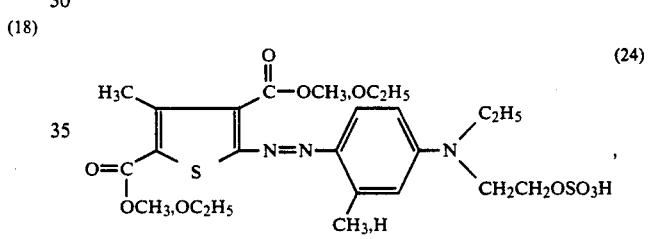
(24)
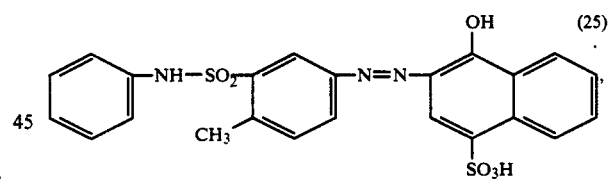
(25)
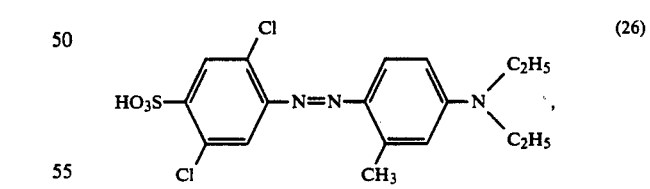
(26)
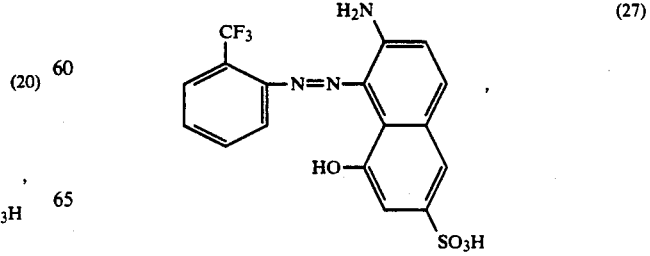
(27)

Yellow- or orange-dyeing dyes used in the process according to the present invention preferably comprise at least one of the dyes of the formulae (35)

where $R_{17}$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $R_{18}$ is hydrogen, chlorine, methyl, trifluoromethyl, o-methylphenoxy, o-chlorophenoxy, o-chlorophenoxysulfonyl, —$SO_2NH_2$, N-$C_{1-2}$-alkylaminosulfonyl, N,N-dimethylaminosulfonyl, N-$\beta$-sulfoethylaminosulfonyl, N-methyl-N-$\beta$-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, $R_{19}$ is hydrogen or chlorine, $R_{20}$ is methyl or phenyl and $R_{21}$ is hydrogen, methyl, ethyl or octyl, (36)

where $A_1$ is hydrogen or methyl, $F_1$ is hydrogen or methyl and $A_2$ and $X_1$ are each independently of the other hydrogen, methyl, ethyl, $\beta$-hydroxyethyl, $\beta$-hydroxypropyl, $\beta$-hydroxybutyl or $\alpha$-ethyl-$\beta$-hydroxyethyl, and the sulfo group is attached in the 3- or 4-position,
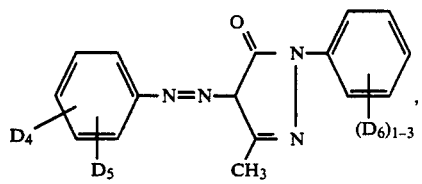 (37)
where $D_4$ is chlorine or phenylaminosulfonyl, $D_5$ is hydrogen or sulfo, $(D_6)_{1-3}$ is 1-3 substituents $D_6$, and $D_6$ is hydrogen, chlorine or sulfo,
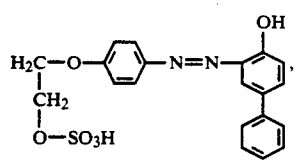 (38)
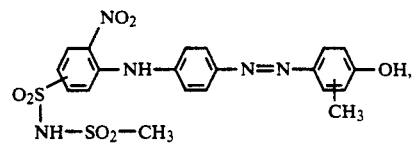 (39)
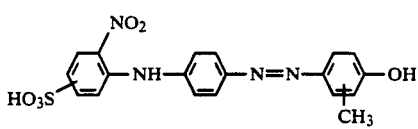 (40)
and
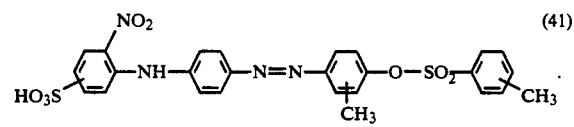 (41)
Preferred yellow- or orange-dyeing dyes of the formula (36) are for example the following dyes:
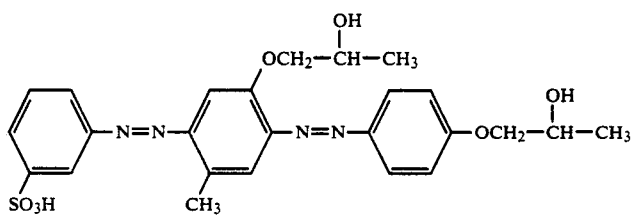 (36a)
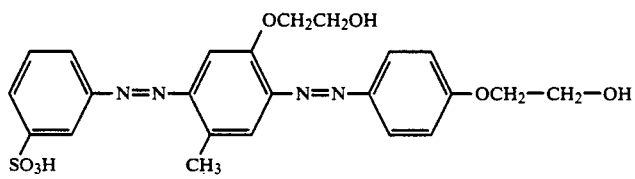 (36b)
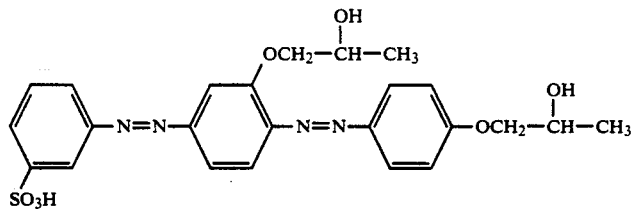 (36c)
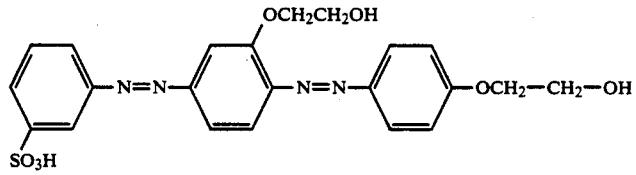 (36d)
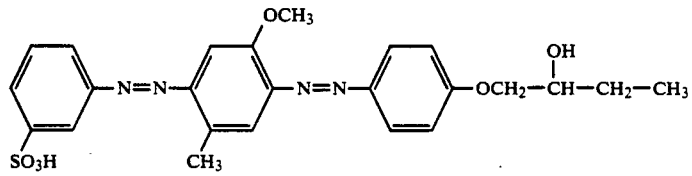 (36e)

-continued
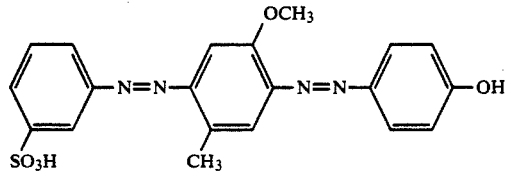 (36f)
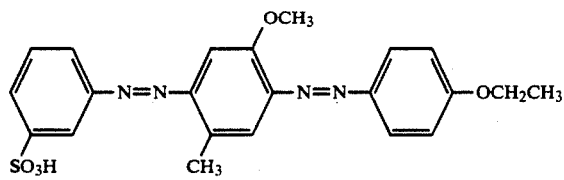 (36g)
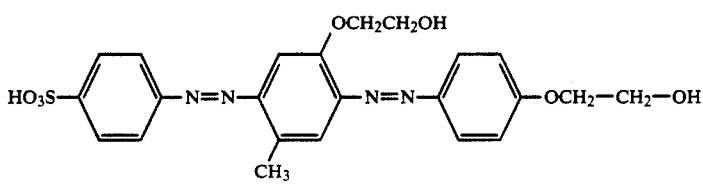 (36h)
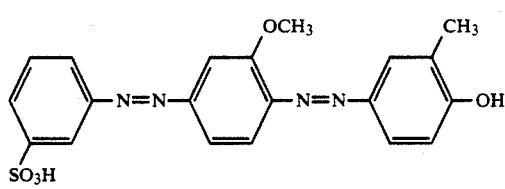 (36i)
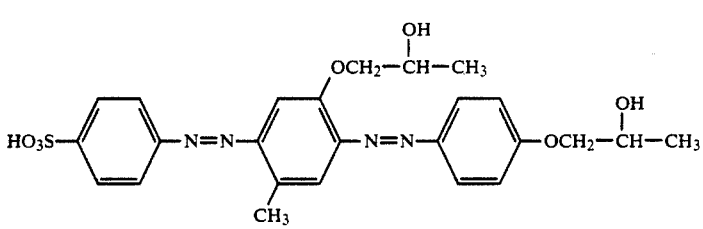 (36j)
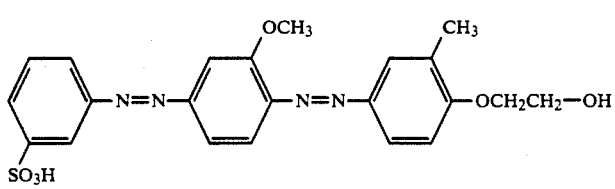 (36k)
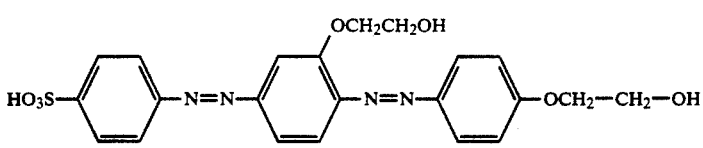 (36l)
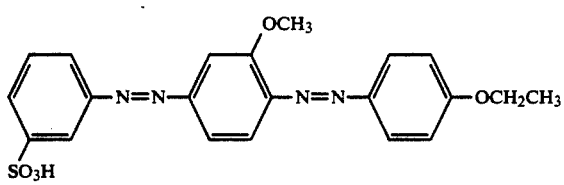 (36m)
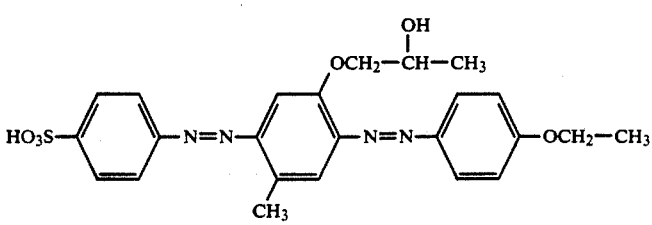 (36n)

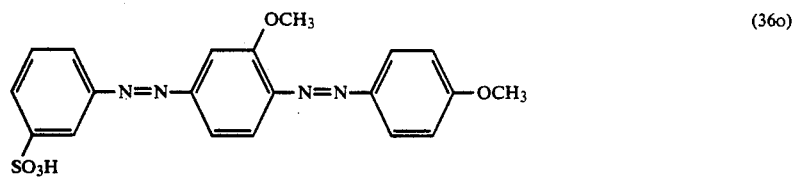 (36o)
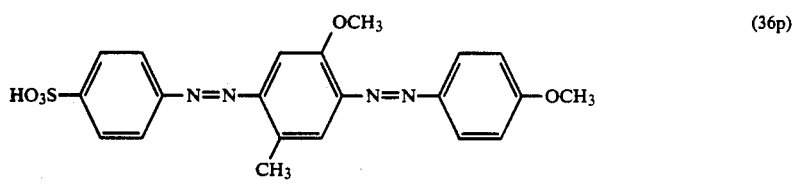 (36p)
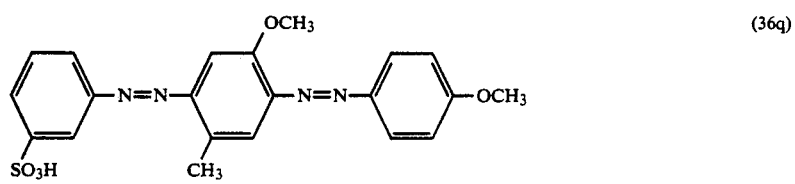 (36q)
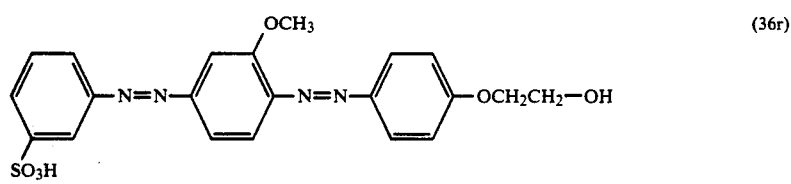 (36r)
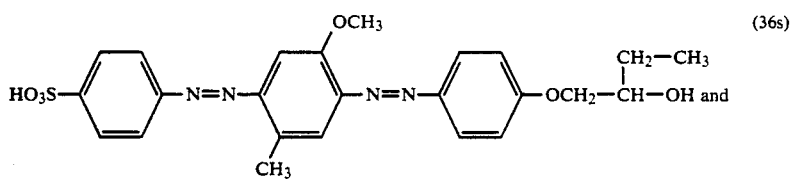 (36s)
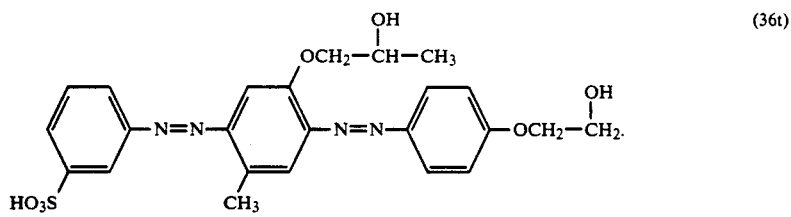 (36t)
Preferred yellow- or orange-dyeing dyes of the formula (37) are for example the following dyes:
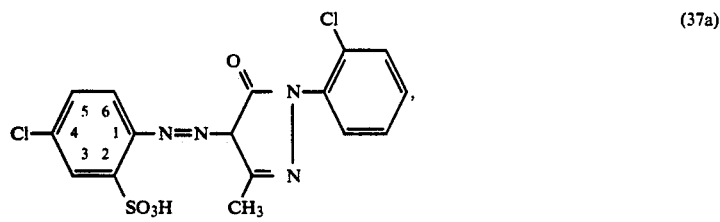 (37a)
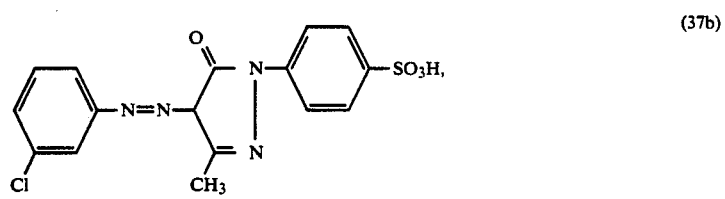 (37b)

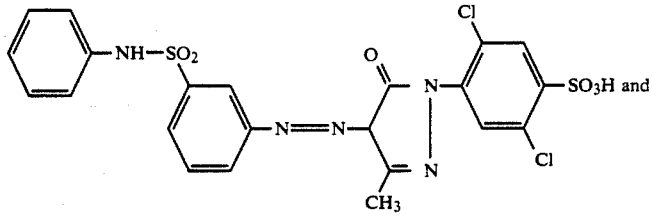
(37c)

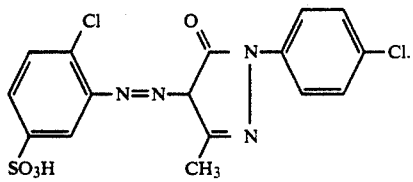
(37d)

Preference is further given to the yellow-dyeing dye of the formula

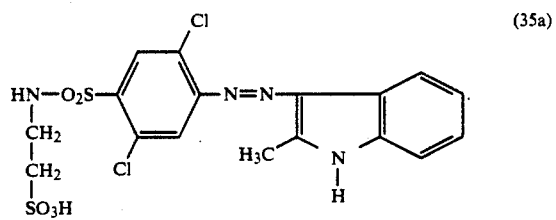
(35a)

Particularly preferred yellow- or orange-dyeing dyes are the dyes of the formulae

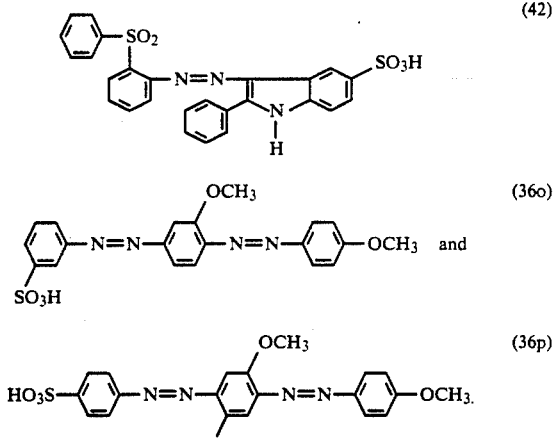
(42)

(36o)

(36p)

Very particular preference is given in the trichromatic dyeing or printing process according to the present invention to the use of a mixture of the dyes of the formulae (1) and (2) in combination with at least one red-dyeing dye of the formula (6), (7) or (8), in a dye of the formula (6) $R_1$ being trifluoromethyl, chlorine, acetylamino, $-SO_2N(n-C_4H_9)_2$, phenoxysulfonyl, phenylsulfonyl, 1-azacycloheptane-N-sulfonyl, cyclohexyloxycarbonylamino, benzoylamino which may be substituted in the phenyl ring by chlorine, phenylaminosulfonyl which may be substituted in the phenyl ring by methyl, cyclohexylaminosulfonyl, N-($C_1$–$C_2$alkyl)phenyl- or N-($C_1$–$C_2$alkyl)cyclohexylaminosulfonyl, $R_2$ being hydrogen, methyl, chlorine or acetylamino, and $R_3$ being hydrogen or chlorine, and in a dye of the formula (7), D being chlorine-, sulfo-, methylaminosulfonyl-, ethylaminosulfonyl- or β-sulfoethylaminosulfonyl-substituted phenyl, methyl-, methoxycarbonyl- or ethoxycarbonyl-substituted thiophenyl or unsubstituted or methyl-, methoxy- or sulfo-substituted benzothiophenyl, $R_6$ being ethyl, $R_7$ being ethyl, β-sulfatoethyl, $-(CH_2)_{2-3}SO_3H$ or benzyl, and $R_8$ being hydrogen or methyl, and in a dye of the formula (8) $R_9$ being methyl, and in combination with at least one yellow- or orange-dyeing dye of the formula (35), (36), (37), (38), (39), (40) or (41), the mixture of the dyes of formulae (1) and (2) being subject to the abovementioned preferences.

Of particular importance is the combination of the mixture of dyes of the formulae (1) and (2) with at least one red-dyeing dye of the formulae (14) to (34) and at least one yellow- or orange-dyeing dye of the formulae (35a), (36a) to (36t), (37a) to (37d), (38), (39), (40), (41) and (42).

In a very particularly important embodiment of the trichromatic dyeing or printing process according to the present invention, use is made of a mixture of the dyes of the formulae (1) and (2) together with the red-dyeing dye of the formula

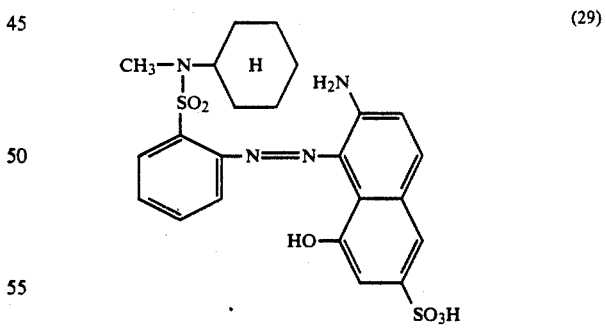
(29)

and the yellow-dyeing dye of the formula

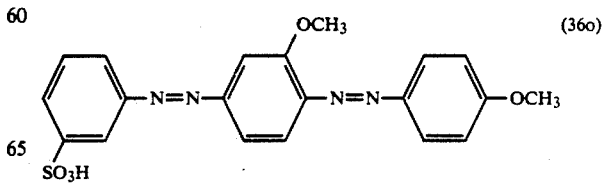
(36o)

or the orange-dyeing dye of the formula

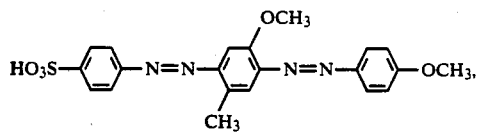 (36p)

the mixture of dyes of the formulae (1) and (2) being subject to the abovementioned preferences.

The dyes used in the process according to the present invention are present either in the form of their free sulfonic acid or preferably as salts thereof.

Suitable salts are for example the alkali metal, alkaline earth metal or ammonium salts or the salts of an organic amine. Examples are the sodium, lithium, potassium or ammonium salts and the salt of triethanolamine.

The dyes used in the process according to the present invention generally contain further additions, for example sodium chloride or dextrin.

The trichromatic dyeing or printing process according to the present invention can be applied to the usual dyeing and printing methods. The dyeing liquors or print with pastes may contain further additives, besides water and the dyes, for example wetting agents, antifoams, levelling agents or agents which affect the properties of the textile material, for example fabric softeners, flame retardants, soil, water and oil repellants, and also water softeners and natural or synthetic thickeners, e.g. alginates and cellulose ethers.

The process according to the present invention is particularly suitable for dyeing from short liquors, for example in continuous dyeing processes or batchwise or continuous foam dyeing processes.

The dyes used in the process according to the present invention are notable in trichromatic dyeing or printing for uniform colour build-up, good dyeing characteristics, good shade constancy over a wide concentration range, good fastness properties in particular very good compatibility.

The process according to the present invention is suitable for dyeing or printing not only natural polyamide materials, for example wool, but also synthetic polyamide materials, such as nylon 6 or nylon 6.6, and it is suitable for dyeing or printing blend fabrics or yarns which contain wool and synthetic polyamide.

For treatment in the process according to the present invention, the textile material mentioned can be in a wide variety of processing forms, for example in the form of fibre, yarn, woven fabric or knitted fabric and in particular in the form of carpet.

In the Examples which follow, parts are by weight. The temperatures are given in degrees Celsius. Parts by weight bear the same relation to parts by volume as the gram to the cubic centimetre.

EXAMPLE 1

To prepare the dye mixture which contains a dye of the formula

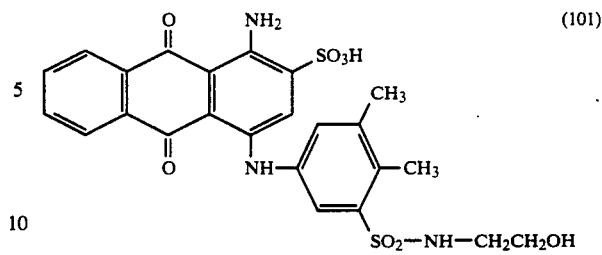 (101)

and one of the dyes of the formulae

 (102)

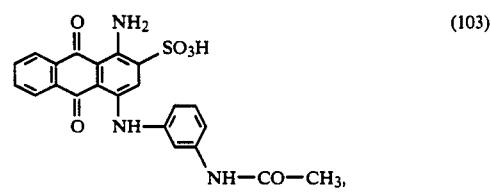 (103)

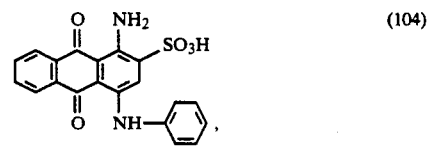 (104)

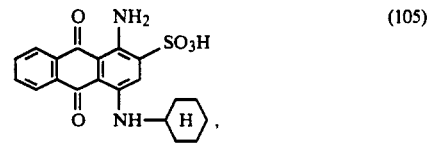 (105)

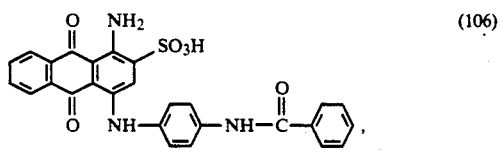 (106)

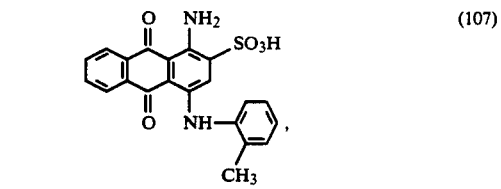 (107)

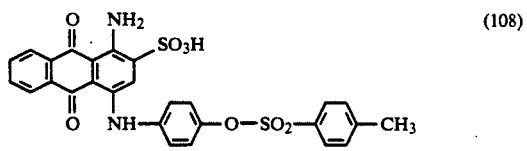 (108)

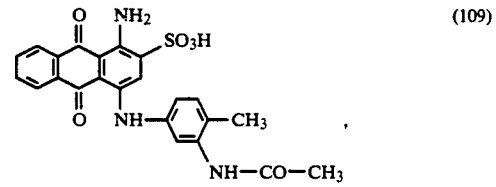 (109)

-continued

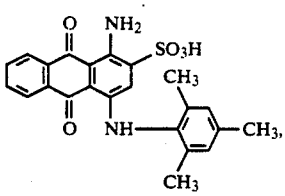 (110)

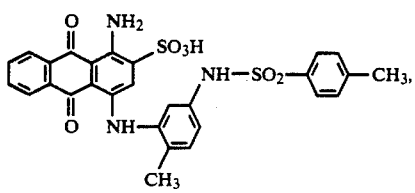 (111)

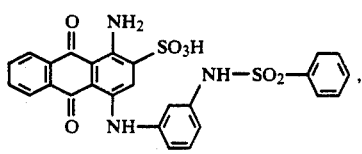 (112)

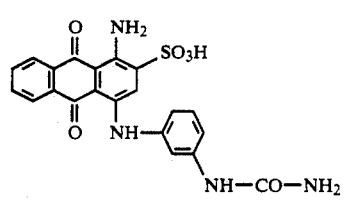 (113)

and

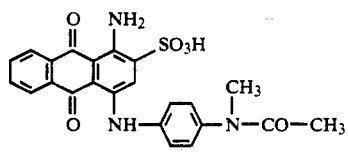 (114)

homogeneous mixing is carried out in a mixer between a) 30.2 parts of the dye of the formula (101) and 69.8 parts of the dye of the formula (103), producing 100 parts of a mixture which hereinafter will be referred to as dye mixture A;

b) 56.6 parts of the dye of the formula (101) and 43.4 parts of the dye of the formula (102), producing 100 parts of a mixture which hereinafter will be referred to as dye mixture B;

c) 79.6 parts of the dye of the formula (101) and 20.4 parts of the dye of the formula (102), producing 100 parts of a mixture which hereinafter will be referred to as dye mixture C;

d) 26.6 parts of the dye of the formula (101) and 73.4 parts of the dye of the formula (103), producing 100 parts of a mixture which hereinafter will be referred to as dye mixture D;

e) 52 parts of the dye of the formula (101) and 48 parts of the dye of the formula (103), producing 100 parts of a mixture which hereinafter will be referred to as dye mixture E;

f) 76.5 parts of the dye of the formula (101) and 23.5 parts of the dye of the formula (103), producing 100 parts of a mixture which hereinafter will be referred to as dye mixture F;

g) 79.6 parts of the dye of the formula (101) and 20.4 parts of the dye of the formula (104), producing 100 parts of a mixture which hereinafter will be referred to as dye mixture G;

h) 26.6 parts of the dye of the formula (101) and 73.4 parts of the dye of the formula (105), producing 100 parts of a mixture which hereinafter will be referred to as dye mixture H;

i) 52 parts of the dye of the formula (101) and 48 parts of the dye of the formula (106), producing 100 parts of a mixture which hereinafter will be referred to as dye mixture I;

k) 76.5 parts of the dye of the formula (101) and 23.5 parts of the dye of the formula (107), producing 100 parts of a mixture which hereinafter will be referred to as dye mixture K;

l) 79.6 parts of the dye of the formula (101) and 20.4 parts of the dye of the formula (108), producing 100 parts of a mixture which hereinafter will be referred to as dye mixture L;

m) 26.6 parts of the dye of the formula (101) and 73.4 parts of the dye of the formula (109), producing 100 parts of a mixture which hereinafter will be referred to as dye mixture M;

n) 52 parts of the dye of the formula (101) and 48 parts of the dye of the formula (110), producing 100 parts of a mixture which hereinafter will be referred to as dye mixture N;

o) 76.5 parts of the dye of the formula (101) and 23.5 parts of the dye of the formula (111), producing 100 parts of a mixture which hereinafter will be referred to as dye mixture O;

p) 79.6 parts of the dye of the formula (101) and 20.4 parts of the dye of the formula (112), producing 100 parts of a mixture which hereinafter will be referred to as dye mixture P;

q) 26.6 parts of the dye of the formula (101) and 73.4 parts of the dye of the formula (113), producing 100 parts of a mixture which hereinafter will be referred to as dye mixture Q;

r) 52 parts of the dye of the formula (101) and 48 parts of the dye of the formula (114), producing 100 parts of a mixture which hereinafter will be referred to as dye mixture R.

EXAMPLE 2

10 parts of a nylon-6.6 fabric (Helanca tricot) are dyed in 500 parts of aqueous liquor which contains 2 g/l of ammonium acetate and is adjusted to pH 5 with acetic acid. The dyes used are 0.27% of the yellow dye of the formula

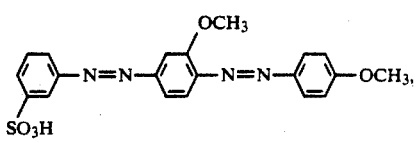 (115)

0.12% of the red dye of the formula

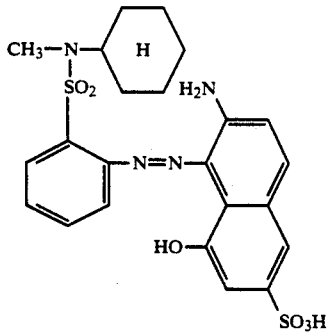

(116)

and 0.13% of the blue dye mixture E obtained as per Example 1e), the percentages being on weight of fibre. The dyeing time at 60° to 98° is 30 to 90 minutes. The dyed Helanca is then removed and rinsed and dried in conventional manner. The result obtained on the fabric is a completely level neutral brown dyeing which is free of any stripyness due to the material.

EXAMPLES 3 TO 18

Example 2 is repeated, except that the 0.27% of the yellow dye of the formula (115), the 0.12% of the red dye of the formula (116) and the 0.13% of the blue dye mixture E are replaced by the dyes of the formulae (115) and (116) indicated in Table 1 below and by the dye mixture of Example 1. Completely level dyeings are obtained in the stated shade.

TABLE 1

| Example | Dyes used | Shade |
|---|---|---|
| 3 | 0.18% of the dye of the formula (115)<br>0.17% of the dye of the formula (116)<br>0.07% of dye mixture F | reddish brown |
| 4 | 0.25% of the dye of the formula (115)<br>0.036% of the dye of the formula (116)<br>0.124% of dye mixture D | olive |
| 5 | 0.29% of the dye of the formula (115)<br>0.13% of the dye of the formula (116)<br>0.13% of dye mixture B | neutral brown |

TABLE 1-continued

| Example | Dyes used | Shade |
|---|---|---|
| 6 | 0.18% of the dye of the formula (115)<br>0.18% of the dye of the formula (116)<br>0.077% of dye mixture C | reddish brown |
| 7 | 0.25% of the dye of the formula (115)<br>0.04% of the dye of the formula (116)<br>0.14% of dye mixture A | olive |
| 8 | 0.18% of the dye of the formula (115)<br>0.18% of the dye of the formula (116)<br>0.07% of dye mixture G | reddish brown |
| 9 | 0.25% of the dye of the formula (115)<br>0.036% of the dye of the formula (116)<br>0.13% of dye mixture H | olive |
| 10 | 0.29% of the dye of the formula (115)<br>0.125% of the dye of the formula (116)<br>0.13% of dye mixture I | neutral brown |
| 11 | 0.18% of the dye of the formula (115)<br>0.18% of the dye of the formula (116)<br>0.08% of dye mixture K | reddish brown |
| 12 | 0.18% of the dye of the formula (115)<br>0.17% of the dye of the formula (116)<br>0.075% of dye mixture L | reddish brown |
| 13 | 0.25% of the dye of the formula (115)<br>0.035% of the dye of the formula (116)<br>0.12% of dye mixture M | olive |
| 14 | 0.29% of the dye of the formula (115)<br>0.13% of the dye of the formula (116)<br>0.13% of dye mixture N | neutral brown |
| 15 | 0.185% of the dye of the formula (115)<br>0.18% of the dye of the formula (116)<br>0.077% of dye mixture O | reddish brown |
| 16 | 0.18% of the dye of the formula (115)<br>0.17% of the dye of the formula (116)<br>0.07% of dye mixture P | reddish brown |
| 17 | 0.25% of the dye of the formula (115)<br>0.04% of the dye of the formula (116)<br>0.125% of dye mixture Q | olive |
| 18 | 0.29% of the dye of the formula (115)<br>0.13% of the dye of the formula (116)<br>0.13% of dye mixture R | neutral brown |

EXAMPLES 19 TO 53

Example 2 is repeated, except that the 0.12% of the red dye of the formula (116) is replaced by 0.12% of the red dyes indicated in Table 2 below or of the red dye mixtures in the stated compositions. Level brown dyeings are obtained.

TABLE 2

| Example | Dyes used |
|---|---|
| 19 | 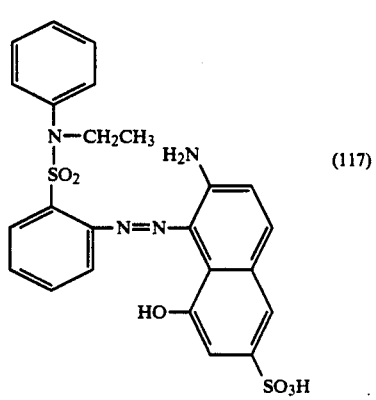 (117) |

TABLE 2-continued
| Example | Dyes used |
|---|---|
| 20 | 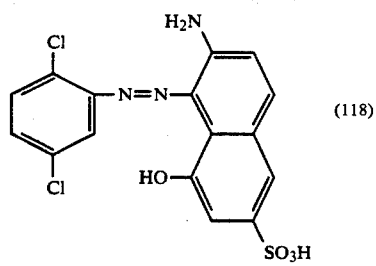 (118) |
| 21 | 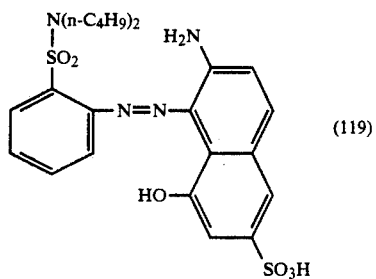 (119) |
| 22 | 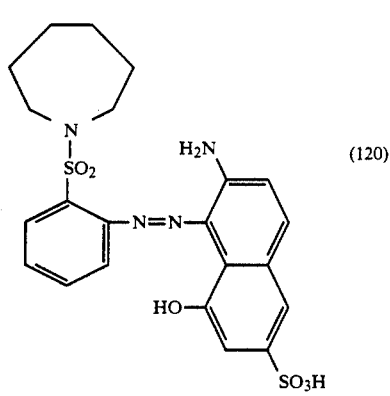 (120) |
| 23 | 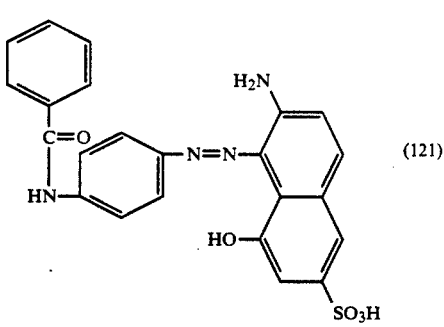 (121) |
| 24 | 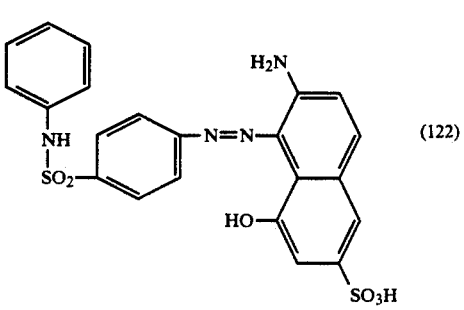 (122) |

TABLE 2-continued
| Example | Dyes used | |
|---|---|---|
| 25 | 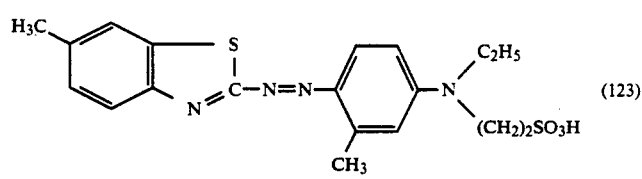 | (123) |
| 26 | 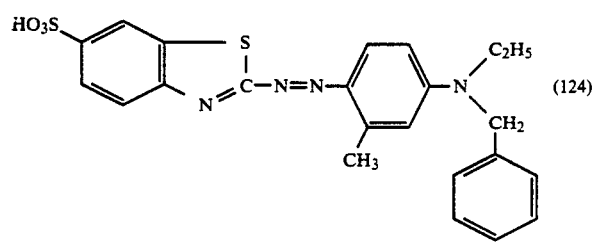 | (124) |
| 27 | 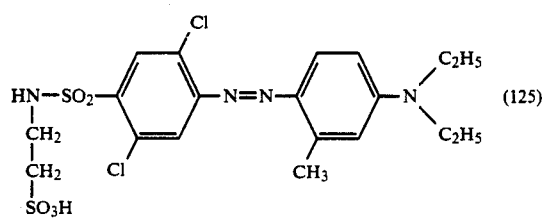 | (125) |
| 28 | 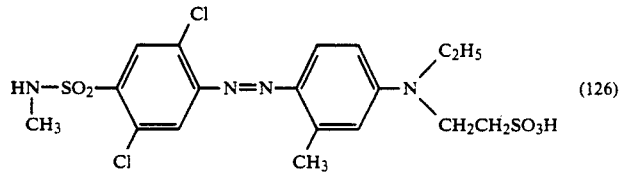 | (126) |
| 29 | 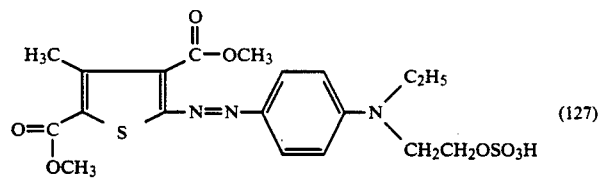 | (127) |
| 30 | 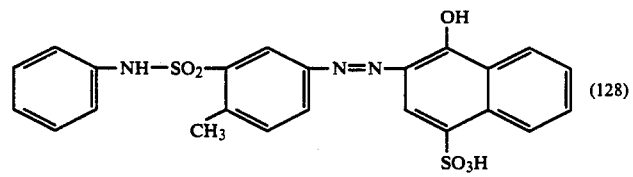 | (128) |
| 31 | 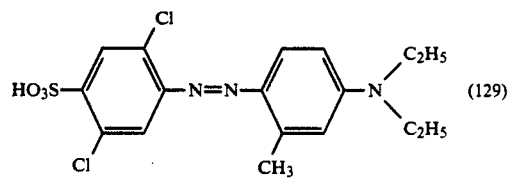 | (129) |

TABLE 2-continued
| Example | Dyes used |
|---|---|
| 32 | 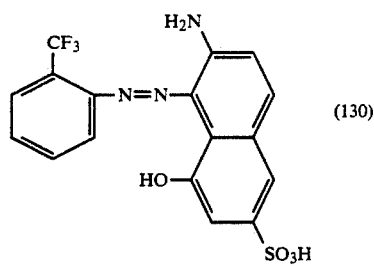 (130) |
| 33 | 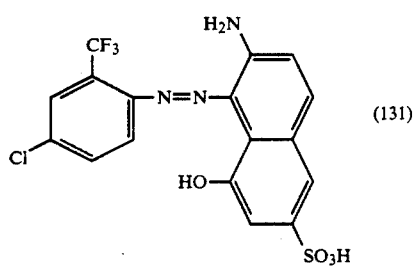 (131) |
| 34 | 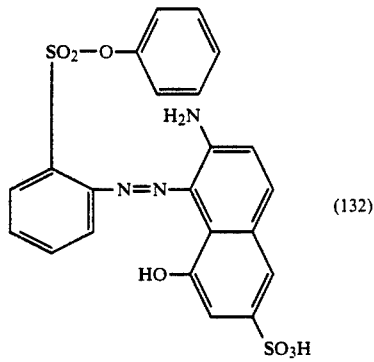 (132) |
| 35 | 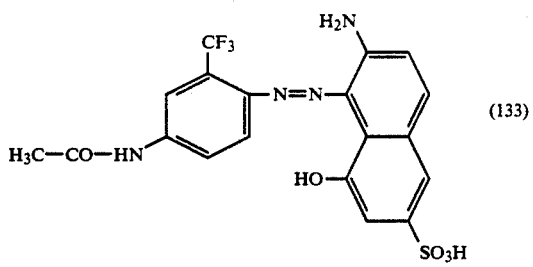 (133) |
| 36 | 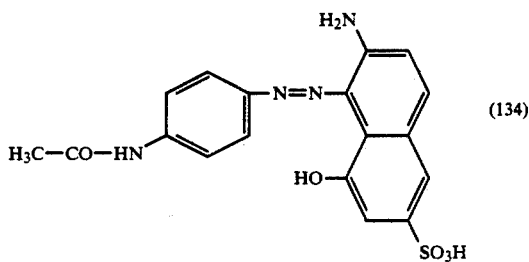 (134) |

TABLE 2-continued

| Example | Dyes used |
|---|---|
| 37 | 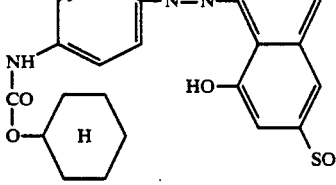 (135) |
| 38 | (136) |
| 39 | Mixture of 20 parts of the dye of the formula (117) and 80 parts of the dye of the formula (119) |
| 40 | Mixture of 50 parts of the dye of the formula (117) and 50 parts of the dye of the formula (120) |
| 41 | Mixture of 70 parts of the dye of the formula (117) and 30 parts of the dye of the formula (122) |
| 42 | Mixture of 30 parts of the dye of the formula (117) and 70 parts of the dye of the formula (123) |
| 43 | Mixture of 40 parts of the dye of the formula (117) and 60 parts of the dye of the formula (126) |
| 44 | Mixture of 20 parts of the dye of the formula (117) and 80 parts of the dye of the formula (129) |
| 45 | Mixture of 50 parts of the dye of the formula (117) and 50 parts of the dye of the formula (124) |
| 46 | Mixture of 70 parts of the dye of the formula (117) and 30 parts of the dye of the formula (125) |
| 47 | Mixture of 30 parts of the dye of the formula (117) and 70 parts of the dye of the formula (121) |
| 48 | Mixture of 40 parts of the dye of the formula (116) and 60 parts of the dye of the formula (121) |
| 49 | Mixture of 20 parts of the dye of the formula (116) and 80 parts of the dye of the formula (122) |
| 50 | Mixture of 50 parts of the dye of the formula (116) and 50 parts of the dye of the formula (123) |
| 51 | Mixture of 70 parts of the dye of the formula (116) and 30 parts of the dye of the formula (129) |
| 52 | Mixture of 30 parts of the dye of the formula (116) and 70 parts of the dye of the formula (119) |
| 53 | Mixture of 40 parts of the dye of the formula (116) and 60 parts of the dye of the formula (120) |

EXAMPLES 54 TO 92

Example 2 is repeated, except that the 0.27% of the yellow dye of the formula (115) is replaced by 0.27% of the yellow or orange dyes indicated in Table 3 below or of dye mixtures in the stated compositions. Level brown dyeings are obtained.

TABLE 3

| Example | Dyes used |
|---|---|
| 54 | 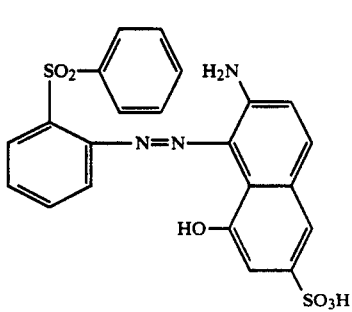 (137) |

TABLE 3-continued

| Example | Dyes used | |
|---|---|---|
| 55 | HO₃S—C₆H₄—N=N—C₆H₂(OCH₃)(CH₃)—N=N—C₆H₄—OCH₃ | (138) |
| 56 | (3-SO₃H)C₆H₄—N=N—C₆H₂(OCH₂CH(OH)CH₃)(CH₃)—N=N—C₆H₄—OCH₂CH(OH)CH₃ | (139) |
| 57 | (3-SO₃H)C₆H₄—N=N—C₆H₂(OCH₂CH₂OH)(CH₃)—N=N—C₆H₄—OCH₂—CH₂—OH | (140) |
| 58 | (3-SO₃H)C₆H₄—N=N—C₆H₃(OCH₂CH(OH)CH₃)—N=N—C₆H₄—OCH₂CH(OH)CH₃ | (141) |
| 59 | (3-SO₃H)C₆H₄—N=N—C₆H₃(OCH₂CH₂OH)—N=N—C₆H₄—OCH₂—CH₂—OH | (142) |
| 60 | (3-SO₃H)C₆H₄—N=N—C₆H₂(OCH₃)(CH₃)—N=N—C₆H₄—OCH₂CH(OH)CH₂—CH₃ | (143) |
| 61 | (3-SO₃H)C₆H₄—N=N—C₆H₂(OCH₃)(CH₃)—N=N—C₆H₄—OH | (144) |
| 62 | (3-SO₃H)C₆H₄—N=N—C₆H₂(OCH₃)(CH₃)—N=N—C₆H₄—OCH₂CH₃ | (145) |

TABLE 3-continued

| Example | Dyes used | |
|---|---|---|
| 63 | HO₃S—C₆H₄—N=N—C₆H₂(OCH₂CH₂OH)(CH₃)—N=N—C₆H₄—OCH₂—CH₂—OH | (146) |
| 64 | C₆H₄(SO₃H)—N=N—C₆H₃(OCH₃)—N=N—C₆H₃(CH₃)—OH | (147) |
| 65 | HO₃S—C₆H₄—N=N—C₆H₂(OCH₂—CH(OH)—CH₃)(CH₃)—N=N—C₆H₄—OCH₂—CH(OH)—CH₃ | (148) |
| 66 | C₆H₄(SO₃H)—N=N—C₆H₃(OCH₃)—N=N—C₆H₃(CH₃)—OCH₂CH₂—OH | (149) |
| 67 | HO₃S—C₆H₄—N=N—C₆H₃(OCH₂CH₂OH)—N=N—C₆H₄—OCH₂—CH₂—OH | (150) |
| 68 | C₆H₄(SO₃H)—N=N—C₆H₃(OCH₃)—N=N—C₆H₄—OCH₂CH₃ | (151) |
| 69 | HO₃S—C₆H₄—N=N—C₆H₂(OCH₂—CH(OH)—CH₃)(CH₃)—N=N—C₆H₄—OCH₂—CH₃ | (152) |
| 70 | Cl—C₆H₃(Cl)(SO₃H)—N=N—CH(C(O)NH—C₆H₄—Cl)—C(CH₃)=N—N | (153) |

TABLE 3-continued

| Example | Dyes used | |
|---|---|---|
| 71 | [Structure: 3-chlorophenyl-N=N-C(=O)-N(4-sulfophenyl)-N=C(CH₃)-] | (154) |
| 72 | [Structure: phenyl-NH-SO₂-(phenyl)-N=N-C(=O)-N(2,5-dichloro-4-sulfophenyl)-N=C(CH₃)-] | (155) |
| 73 | [Structure: 2-chloro-5-sulfophenyl-N=N-C(=O)-N(4-chlorophenyl)-N=C(CH₃)-] | (156) |
| 74 | [Structure: 3-sulfophenyl-N=N-(2-methoxy-5-methylphenyl)-N=N-(4-methoxyphenyl)] | (157) |
| 75 | [Structure: 3-sulfophenyl-N=N-(2-methoxyphenyl)-N=N-(4-OCH₂CH₂OH-phenyl)] | (158) |
| 76 | [Structure: 4-sulfophenyl-N=N-(2-methoxy-5-methylphenyl)-N=N-(4-OCH₂CH(CH₂CH₃)-OH-phenyl)] | (159) |
| 77 | [Structure: 3-sulfophenyl-N=N-(2-(OCH₂CH(OH)CH₃)-5-methylphenyl)-N=N-(4-OCH₂CH₂OH-phenyl)] | (160) |
| 78 | [Structure: 4-(OCH₂CH₂-O-SO₃H)-phenyl-N=N-(2-hydroxy-5-phenylphenyl)] | (161) |

TABLE 3-continued

| Example | Dyes used | |
|---|---|---|
| 79 | [Structure: 2-NO₂, 4-($O_2S$-NH-$SO_2$-$CH_3$)-phenyl-NH-phenyl-N=N-phenyl(3-$CH_3$, 4-OH)] | (162) |
| 80 | [Structure: $HO_3S$-phenyl(2-$NO_2$)-NH-phenyl-N=N-phenyl(3-$CH_3$, 4-OH)] | (163) |
| 81 | [Structure: $HO_3S$-phenyl(2-$NO_2$)-NH-phenyl-N=N-phenyl(3-$CH_3$, 4-O-$SO_2$-phenyl-$CH_3$)] | (164) |
| 82 | [Structure: $HO_3S$-$CH_2$-$CH_2$-NH-$O_2S$-phenyl(2,5-diCl)-N=N-(2-methylindol-3-yl)] | (165) |
| 83 | Mixture of 20 parts of the dye of the formula (137) and 80 parts of the dye of the formula (115) | |
| 84 | Mixture of 50 parts of the dye of the formula (137) and 50 parts of the dye of the formula (138) | |
| 85 | Mixture of 70 parts of the dye of the formula (137) and 30 parts of the dye of the formula (143) | |
| 86 | Mixture of 30 parts of the dye of the formula (137) and 70 parts of the dye of the formula (144) | |
| 87 | Mixture of 40 parts of the dye of the formula (137) and 60 parts of the dye of the formula (145) | |
| 88 | Mixture of 20 parts of the dye of the formula (137) and 80 parts of the dye of the formula (151) | |
| 89 | Mixture of 50 parts of the dye of the formula (137) and 50 parts of the dye of the formula (153) | |
| 90 | Mixture of 70 parts of the dye of the formula (137) and 30 parts of the dye of the formula (156) | |
| 91 | Mixture of 30 parts of the dye of the formula (137) and 70 parts of the dye of the formula (161) | |
| 92 | Mixture of 40 parts of the dye of the formula (137) and 60 parts of the dye of the formula (163) | |

EXAMPLE 93

10 parts of a nylon-6.6 fabric (Helanca tricot) are dyed in 500 parts of an aqueous liquor which contains 2 g/l of ammonium acetate and has been adjusted to pH 5 with acetic acid. The amount of dye mixture B or D is 0.9%, on weight of fibre. The dyeing time at 98° is 30 to 90 minutes. The dyed Helanca is subsequently removed and rinsed and dried in a conventional manner. Both dye mixtures give blue level dyeings free of any stripyness due to the material. The shade obtained with dye mixture B is somewhat greenish, that obtained with dye mixture D somewhat reddish.

Example 93 is repeated, except that the 0.9% of dye mixture B or D is replaced by 0.9% of one of the other blue dye mixtures indicated in Example 1. A blue dyeing is obtained with a more or less pronounced reddish or greenish tinge.

EXAMPLE 94

10 parts of nylon 6.6 yarn are dyed in 400 parts of an aqueous liquor which contains 1.5 g/l of ammonium acetate and is adjusted to pH 5.5 with acetic acid. The dyes used are 0.27% of the dye of the formula (115), 0.12% of the dye of the formula (116) and 0.13% of dye mixture E obtained as per Example 1e), the percentages being on weight of fiber. The dye bath is heated to 98° in the course of 30 minutes and maintained at 96° to 98° for 60 minutes. The dyed yarn is then removed and rinsed and dried in a conventional manner. The result obtained on the yarn is a neutral brown dyeing.

On replacing the 0.27% of the yellow dye of the formula (115), the 0.12% of the red dye of the formula (116) and the 0.13% of the blue dye mixture E by the dyes indicated in Table 4 below and by dye mixtures A, B, C, D and F from Example 1, dyeings are obtained in the stated shade.

TABLE 4

| Example | Dyes used | Shade |
|---|---|---|
| 95 | 0.18% of the dye of the formula (115)<br>0.17% of the dye of the formula (116)<br>0.07% of the dye mixture F | reddish brown |
| 96 | 0.25% of the dye of the formula (115)<br>0.036% of the dye of the formula (116)<br>0.124% of dye mixture D | olive |
| 97 | 0.29% of the dye of the formula (115)<br>0.13% of the dye of the formula (116)<br>0.13% of dye mixture B | neutral brown |
| 98 | 0.18% of the dye of the formula (115)<br>0.18% of the dye of the formula (116)<br>0.077% of dye mixture C | reddish brown |
| 99 | 0.25% of the dye of the formula (115)<br>0.04% of the dye of the formula (116)<br>0.14% of dye mixture A | olive |
| 100 | 0.18% of the dye of the formula (137)<br>0.17% of the dye of the formula (117)<br>0.07% of dye mixture F | reddish brown |
| 101 | 0.25% of the dye of the formula (137)<br>0.036% of the dye of the formula (131)<br>0.124% of dye mixture D | olive |
| 102 | 0.29% of the dye of the formula (137)<br>0.13% of the dye of the formula (120)<br>0.13% of dye mixture B | neutral brown |
| 103 | 0.18% of the dye of the formula (138)<br>0.18% of the dye of the formula (120)<br>0.077% of dye mixture C | reddish brown |
| 104 | 0.25% of the dye of the formula (143)<br>0.04% of the dye of the formula (131)<br>0.14% of dye mixture A | olive |
| 105 | 0.18% of the dye of the formula (163)<br>0.17% of the dye of the formula (133)<br>0.07% of dye mixture F | reddish brown |
| 106 | 0.25% of the dye of the formula (165)<br>0.036% of the dye of the formula (136)<br>0.124% of dye mixture D | olive |

Furthermore, on using instead of the yellow dye of the formula (115) the orange dye of the formula

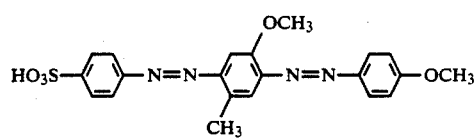

(138)

or (137) and instead of the red dye of the formula (115) the dyes indicated in Table 5 together with dye mixtures A, B, C, D, E or F of Example 1, dyeings are obtained in the shade stated in Table 5.

TABLE 5

| Example | Dyes used | Shade |
|---|---|---|
| 107 | 0.27% of the dye of the formula (138)<br>0.09% of the dye of the formula (116)<br>0.14% of dye mixture E | neutral brown |
| 108 | 0.18% of the dye of the formula (138)<br>0.11% of the dye of the formula (116)<br>0.09% of dye mixture F | reddish brown |
| 109 | 0.25% of the dye of the formula (138)<br>0.02% of the dye of the formula (116)<br>0.14% of dye mixture D | olive |
| 110 | 0.27% of the dye of the formula (138)<br>0.1% of the dye of the formula (116)<br>0.14% of dye mixture B | neutral brown |
| 111 | 0.18% of the dye of the formula (138)<br>0.12% of the dye of the formula (116)<br>0.09% of dye mixture C | reddish brown |
| 112 | 0.25% of the dye of the formula (138)<br>0.03% of the dye of the formula (116)<br>0.16% of dye mixture A | olive |
| 113 | 0.27% of the dye of the formula (137)<br>0.09% of the dye of the formula (133)<br>0.14% of dye mixture F | neutral brown |
| 114 | 0.18% of the dye of the formula (137)<br>0.11% of the dye of the formula (120)<br>0.09% of dye mixture D | reddish brown |
| 115 | 0.25% of the dye of the formula (137)<br>0.02% of the dye of the formula (116)<br>0.14% of dye mixture E | olive |
| 116 | 0.27% of the dye of the formula (137)<br>0.1% of the dye of the formula (131)<br>0.14% of dye mixture B | neutral brown |
| 117 | 0.18% of the dye of the formula (137)<br>0.12% of the dye of the formula (125)<br>0.09% of dye mixture C | reddish brown |
| 118 | 0.25% of the dye of the formula (137)<br>0.03% of the dye of the formula (136)<br>0.16% of dye mixture A | olive |

EXAMPLE 119 (CARPET EXHAUST METHOD)

A beam dyeing machine (laboratory piece dyeing machine, Model 10 from Rudolf Then) consists in the main of a horizontal dyeing kier with cooling jacket, connected to a side tank with its special reverser pump to form a circulation system.

This dyeing machine is entered with a beam equipped with a nylon-6 loop pile carpet material 50 cm in width, 135 cm in length and 380 g in weight. The side tank contains 6 liters of softened water and 60 ml of 2N sodium hydroxide solution. On opening the appropriate valves (side tank or connection lines, pump/dyeing kier) the liquor flows under its own weight from the side tank into the dyeing kier, displacing the air through the vent line into the side tank. When the dyeing machine is full, about 5 cm of liquor remains in the side tank, and the circulation pump is then switched on. To check the pH, a bore was introduced into the pipe line between the dyeing kier and the side tank in the flow direction to receive a combined glass electrode. During the entire dyeing process the dyeing liquor is pumped from in to out at a rate of about 6 liters per minute, the pressure drop being 0.1 to 2 bar. The liquor is heated to 98°, and 7.6 g of an anionic levelling agent which has affinity for the fibre is introduced into the side tank over 5 minutes in the form of a solution in 100 ml of water.

The dyeing temperature is set to 97°-98°, and the pH is 10.7. The pH of a sample taken and cooled to 20° is 11.9.

2.5 g of the yellow dye of the formula (115) of Example 2 and 1.8 g of the blue dye mixture C of Example 1, both dissolved in 200 ml of hot water, are then added from a dropping funnel into the side tank in the course of 10 minutes. After 30 minutes, a piston burette is used to add a total of 100 ml of 1N sulfuric acid at a rate of 5.5 ml per minute for 10 minutes and then at a rate of 2.25 ml per minute for 20 minutes.

The pH is 3.8 after a further 10 minutes. The dyebath is exhausted; that is, more than 99% of the dyes has gone onto the fibre. When the heating is switched off, the dyeing liquor is cooled with indirect cooling to 60°. During this period, the pH rises to 3.9. The almost clear liquor is pumped back into the side tank, and the beam is removed. The carpet material is unwound, centrifuged and dried. The nylon-6 loop carpet material has been dyed a green shade which is level in the piece.

EXAMPLE 120: (CARPET PRINTING)

A nylon-6 velour carpet material having a weight of 350 to 400 g/m² is impregnated with a padding consisting of 988 parts of water, 10 parts of 36° Be sodium hydroxide solution and 2 parts of a wetting agent, and squeezed-off on a pad-mangle to a wet pick-up of 80%.

The carpet thus pretreated is sprayed in a pattern through a nozzle with a colour paste of the following composition:
942 parts of water,
50 parts of thickener,
3 parts of antifoam,
3 parts of the yellow dye of the formula (115) of Example 2,
1 part of the red dye of the formula (116) of Example 2 and
1 part of the blue dye mixture B of Example 1.
The thickener used has the following composition:
240 parts of refined naphtha,
50 parts of a water-in-oil emulsifier,
20 parts of an oil-in-water emulsifier
20 parts of antifoam,
50 parts of a crosslinked carboxyvinyl polymer having a molecular weight of about 4,000,000
70 parts of a linear carboxyvinyl polymer having a molecular weight of about 1,000,000 and
550 parts of water adjusted to pH 4.5 with acetic acid.

The material sprayed with the colour paste is then treated with saturated steam at 101° for 5 minutes to fix the dyes, rinsed, neutralized, rinsed again and dried.

The result obtained is a velour carpet material bearing a brown pattern which has very crisp contours and exhibits excellent penetration and no frosting whatsoever.

On repeating the Example using instead of 1 part of the blue dye mixture B of Example 1 one part of the blue dye mixture E of Example 1, the result is a velour carpet material with a brown pattern which has similar properties.

EXAMPLE 121: (CONTINUOUS CARPET DYEING)

4.5 parts of the yellow dye of the formula (115) of Example 2 and 1.5 parts of the blue dye mixture B of Example 1 are dissolved in 100 parts of water by briefly boiling. This solution is added to a solution containing 3 parts of a thickening composition based on carob bean flour, 5.0 parts of a coacervating padding assistant based on a condensation product of a higher molecular weight fatty acid with a hydroxyalkylamine, 2.0 parts of crystalline monosodium phosphate and 1.0 part of crystalline disodium phosphate in 500 parts of cold water. The mixture is then made up to 1000 parts with cold water. This liquor, which has a pH of 5.5 to 6.5, is applied at 300%, on weight of fibre, to a nylon-6.6 needle pile raw carpet at a carpet speed of 8 meters per minute. The impregnated carpet passes into a festoon ager where it is treated with saturated steam at 98°–100° for 10 minutes.

Washing in an open width washer leaves a carpet with a uniformly green colour.

Repeating the Example using instead of the 4.5 parts of the yellow dye of the formula (115) and the 1.5 parts of the blue dye mixture B the dyes or dye mixtures indicated in Table 6 below gives uniform dyeings in the stated shades.

TABLE 6

| Example | Dyes used | Shade |
|---|---|---|
| 122 | 2.7 parts of the dye of the formula (137)<br>1.2 parts of the dye of the formula (117)<br>1.3 parts of dye mixture B | neutral brown |
| 123 | 2.4 parts of the dye of the formula (137)<br>2.3 parts of the dye of the formula (120)<br>1.0 part of dye mixture D | reddish brown |
| 124 | 3.0 parts of the dye of the formula (137)<br>0.4 part of the dye of the formula (131)<br>1.2 parts of dye mixture F | olive |
| 125 | 2.7 parts of the dye of the formula (137)<br>1.2 parts of the dye of the formula (133)<br>1.3 parts of dye mixture H | neutral brown |
| 126 | 2.4 parts of the dye of the formula (137)<br>2.3 parts of the dye of the formula (133)<br>1.0 part of dye mixture K | reddish brown |
| 127 | 2.7 parts of the dye of the formula (115)<br>1.2 parts of the dye of the formula (116)<br>1.3 parts of dye mixture B | neutral brown |
| 128 | 2.4 parts of the dye of the formula (115)<br>2.3 parts of the dye of the formula (116)<br>1.0 part of dye mixture B | reddish brown |
| 129 | 3.0 parts of the dye of the formula (115)<br>0.4 part of the dye of the formula (116)<br>1.2 parts of dye mixture B | olive |
| 130 | 2.7 parts of the dye of the formula (115)<br>1.2 parts of the dye of the formula (116)<br>1.3 parts of dye mixture E | neutral brown |
| 131 | 2.4 parts of the dye of the formula (115)<br>2.3 parts of the dye of the formula (116)<br>1.0 part of dye mixture E | reddish brown |
| 132 | 3.0 parts of the dye of the formula (115)<br>0.4 part of the dye of the formula (116)<br>1.2 parts of dye mixture E | olive |

EXAMPLE 133: (continuous wool dyeing)

A wool fabric is padded with a liquor containing 2.6 parts of the yellow dye of the formula (115), 5.2 parts of the red dye of the formula (116), 15.7 parts of the blue dye mixture B, 2.0 parts of a thickening composition based on alginate, 22.0 parts of a coacervating padding assistant based on a condensation product of a high molecular weight fatty acid with a hydroxyalkylamine and 8.0 parts of 80% formic acid in 1000 parts of water, the wet pick-up achieved being 85%, on weight of fibre. The wool fabric is then steamed in saturated steam at 98°–100° for 15 minutes and washed. A uniform olive dyeing is obtained.

Repeating the Example using instead of the 15.7 parts of the blue dye mixture B 15.7 parts of the blue dye mixture E likewise produces a uniformly olive-coloured wool cloth.

EXAMPLE 134

A nylon-6.6 carpet material having a weight of 550 g/m² is continuously prewetted in an aqueous liquor which contains per liter 1 g of the addition product of 9 moles of ethylene oxide with 1 mole of nonylphenol and continuously squeezed off to a wet pick-up of 45 percent by weight.

A foaming apparatus is used to prepare a colour foam from the following aqueous liquor:
0.7 g/l of the yellow dye of the formula (115),
0.05 g/l of the red dye of the formula (116),
0.4 g/l of the blue dye mixture B,
0.7 g/l of the addition product of 5 moles of ethylene oxide and 5 moles of propylene oxide with 1 mole of $C_{12-14}$ fatty alcohol (e.g. lauryl alcohol), 1.25 g/l of the ammonium salt of the acid sulfuric ester of the addition product of 2 moles of ethylene oxide with 1 mole of nonylphenol, 1 g/l of sodium acetate and acetic acid to adjust the liquor to a pH of 5.8.

The degree of foaming is 1:8.

The half-life of the foam is 5 minutes.

This foam is then applied from a foam vessel equipped with an adjustable doctor blade for setting the desired foam thickness, via an applicator roll and a slide to the pile side of the carpet passing through the dyeing range. The carpet speed is 8 m/minute. The height of the foam layer is 7 mm. The colour foam add-on is 150%.

The carpet then passes through a vacuum passage in which the foam layer is partially sucked into the carpet from the back under a vacuum of 0.1 bar, which somewhat reduces the height of the foam layer. The carpet then passes via a transport roll towards a steamer; along the way, before the steamer is reached, the foam layer on the carpet disintegrates. In the steamer the carpet is treated with saturated steam at 98° C. for 4 minutes. The carpet is then sprayed down with water of 80° C., hydroextracted and dried at 100° C. on a sieve drum dryer.

The result obtained is an olive, level, non-stripy carpet dyeing showing excellent penetration from the top of the pile to the base of the carpet.

Repeating the Example using instead of the 0.4 g/l of the blue dye mixture B 0.4 g/l of the blue dye mixture D likewise produces an olive, level, non-stripy dyeing on the carpet.

What is claimed is:

1. A dye mixture containing a dye of the formula

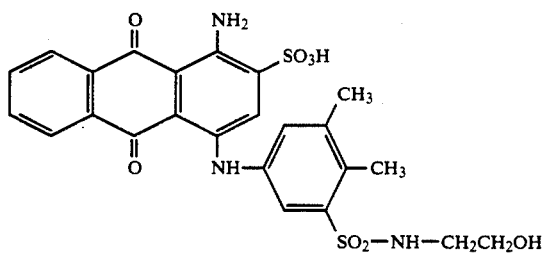

and a dye of the formula

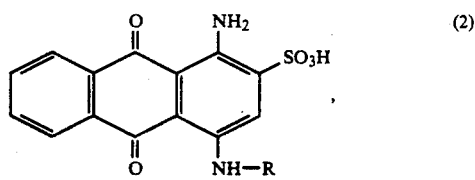

where R is cyclohexyl or phenyl, which may each be substituted by $C_1$–$C_4$alkyl, acetylamino, N-$C_1$–$C_4$alkylacetylamino, benzoylamino, ureido or by phenylsulfonylamino or phenylsulfonyloxy which may each be substituted in the phenyl ring by $C_1$–$C_4$alkyl.

2. A dye mixture according to claim 1, containing a dye of the formula (1) and a dye of the formula (2) where R is cyclohexyl, phenyl, 2-methylphenyl, 2,4,6-trimethylphenyl, 3- or 4-acetylaminophenyl, 3-acetylamino-4-methylphenyl, 4-(N-methylacetylamino)phenyl, 3-ureidophenyl, 4-benzoylaminophenyl, 3-phenylsulfonylaminophenyl, 2-methyl-5-(4'-methylphenylsulfonylamino)phenyl or 4-(4'-methylphenylsulfonyloxy)phenyl.

3. A dye mixture according to claim 1, containing a dye of the formula (1) and a dye of the formula

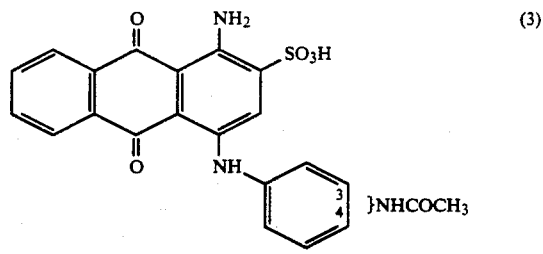

4. A dye mixture according to claim 1, wherein the ratio of the dyes of the formulae (1) and (2) or (1) and (3) is from 95:5 to 5:95.

5. A dye mixture of claim 4 wherein the ratio of dyes is from 80:20 to 20:80.

6. A dye mixture of claim 5 wherein the ratio of dyes is from 60:40 to 40:60.

7. A process for dyeing and printing natural and synthetic polyamide materials with a dye mixture, which comprises using a dye mixture according to claim 1.

8. A process for dyeing and printing natural and synthetic polyamide materials using the dye mixture according to claim 1 in combination with other dyes.

9. A process according to claim 8 for trichromatic dyeing or printing, wherein a dye mixture according to claim 1 is used in combination with at least one red-dyeing dye and at least one yellow- or orange-dyeing dye.

10. A process according to claim 9 for trichromatic dyeing or printing, wherein a dye mixture according to claim 1 is used in combination with at least one red-dyeing dye of the formula (6), (7) or (8):

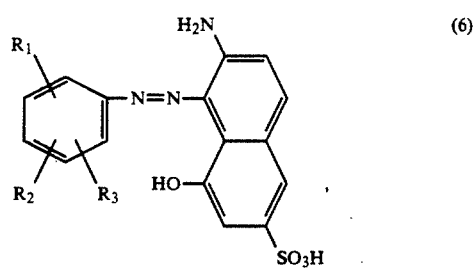

where $R_1$ is substituted or unsubstituted $C_1$–$C_8$alkyl, halogen, phenyl- or phenoxy-sulfonyl which may be substituted in the phenyl ring by $C_1$–$C_4$alkyl, cyclohexyloxycarbonylamino, $C_2$–$C_4$alkanoylamino, benzoylamino which may be substituted in the phenyl ring by halogen, 1-azacycloheptane-N-sulfonyl or

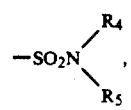

where $R_4$ is $C_1$–$C_8$alkyl or unsubstituted or $C_1$–$C_4$alkyl-substituted phenyl or cyclohexyl and $R_5$ is hydrogen or $C_1$–$C_8$alkyl, $R_2$ is hydrogen, halogen, $C_1$–$C_8$alkyl or $C_2$–$C_4$alkanoylamino, and $R_3$ is hydrogen or halogen,

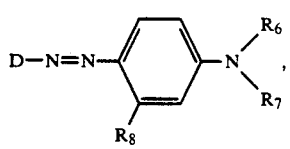 (7)

where D is substituted or unsubstituted phenyl, thiophenyl or benzothiazolyl, $R_6$ is $C_1$–$C_8$alkyl, $R_7$ is substituted or unsubstituted $C_1$–$C_8$alkyl and $R_8$ is hydrogen or $C_1$–$C_4$alkyl, or

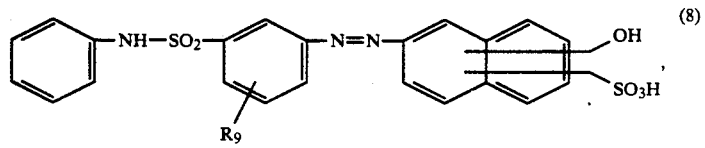 (8)

where $R_9$ is $C_1$–$C_4$alkyl, and in combination with at least one yellow- or orange-dyeing dye of the formula (9), (10), (11), (12) or (13):

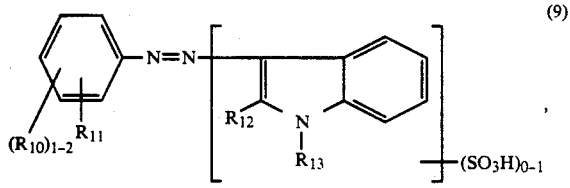 (9)

where $R_{10}$ is hydrogen, $C_1$–$C_4$alkyl, $C_1$–$C_4$alkoxy, halogen, $C_2$–$C_4$alkanoylamino or a substituted or unsubstituted arylsulfonyl, aryloxy or arylcarbonyl radical, $R_{11}$ is hydrogen, halogen, a substituted or unsubstituted alkyl, aryloxy or aryloxysulfonyl radical or a radical of the formula

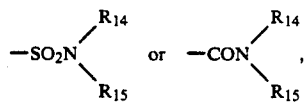

$R_{12}$ is a substituted or unsubstituted alkyl or aryl radical, $R_{13}$ is hydrogen or alkyl and $R_{14}$ and $R_{15}$ are independently of each other hydrogen or a substituted or unsubstituted alkyl, cycloalkyl or aryl radical,

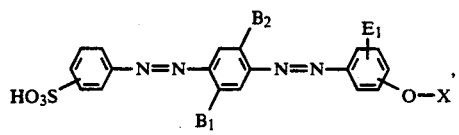 (10)

where $B_1$, $B_2$ and $E_1$ are each hydrogen, $C_1$–$C_4$alkyl, $C_1$–$C_4$alkoxy or $C_2$–$C_4$hydroxyalkoxy and X is straight-chain or branched $C_1$–$C_4$alkyl or straight-chain or branched $C_2$–$C_4$hydroxyalkyl,

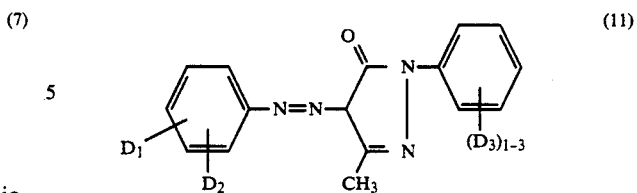 (11)

where $D_1$ is sulfo or has the meaning defined for $R_{10}$ in the formula (9), $D_2$ has the meaning defined for $R_{11}$ in the formula (9), $(D_3)_{1-3}$ is 1–3 substituents $D_3$, and $D_3$ is hydrogen, halogen, $C_1$–$C_4$alkyl, $C_1$–$C_4$alkoxy or sulfo,

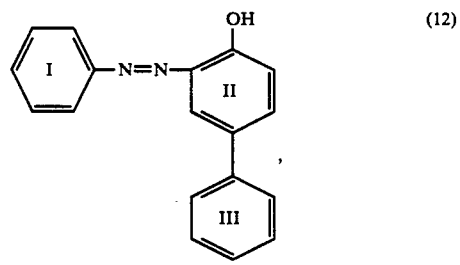 (12)

where the benzene rings I, II and III may be substituted, or

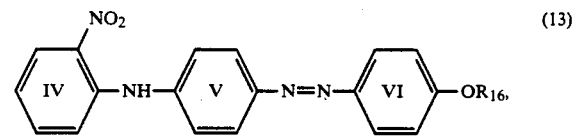 (13)

where the benzene rings IV, V and VI may be substituted and $R_{16}$ is hydrogen or arylsulfonyl.

11. A process according to claim 9 for trichromatic dyeing or printing, wherein use is made of at least one red-dyeing dye of the formula (6), (7) or (8), in a dye of the formula (6) $R_1$ being trifluoromethyl, chlorine, acetylamino, —$SO_2N(n$—$C_4H_9)_2$, phenoxysulfonyl, phenylsulfonyl, 1-azacycloheptane-N-sulfonyl, cyclohexyloxycarbonylamino, benzoylamino which may be substituted in the phenyl ring by chlorine, phenylaminosulfonyl which may be substituted in the phenyl ring by methyl, cyclohexylaminosulfonyl, N-($C_1$–$C_2$alkyl)phenyl- or N-($C_1$–$C_2$alkyl)cyclohexylaminosulfonyl, $R_2$ being hydrogen, methyl, chlorine or acetylamino and $R_3$ being hydrogen or chlorine, and in a dye of the formula (7) D being chlorine-, sulfo-, methylaminosulfonyl-, ethylaminosulfonyl- or β-sulfoethylaminosulfonyl-substituted phenyl, methyl-, methoxycarbonyl- or ethoxycarbonyl-substituted thiophenyl or unsubstituted or methyl-, methoxy- or sulfo-substituted benzothiophenyl, $R_6$ being ethyl, $R_7$ being ethyl, β-sulfatoethyl, —$(CH_2)_{2-3}SO_3H$ or benzyl, and $R_8$ being hydrogen or methyl, and in a dye of the formula (8) $R_9$ being methyl.

12. A process according to claim 9 for trichromatic dyeing or printing, wherein use is made of at least one yellow- or orange-dyeing dye of the formulae

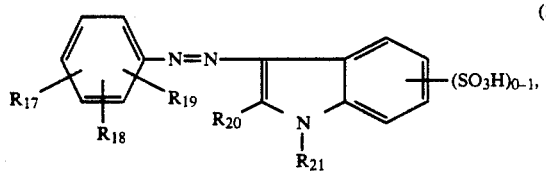 (35)

where $R_{17}$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $R_{18}$ is hydrogen, chlorine, methyl, trifluoromethyl, o-methylphenoxy, o-chlorophenoxy, o-chlorophenoxysulfonyl, —$SO_2NH_2$, N-$C_{1-2}$-alkylaminosulfonyl, N,N-dimethylaminosulfonyl, N-$\beta$-sulfoethylaminosulfonyl, N-methyl-N-$\beta$-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, $R_{19}$ is hydrogen or chlorine, $R_{20}$ is methyl or phenyl and $R_{21}$ is hydrogen, methyl, ethyl or octyl,

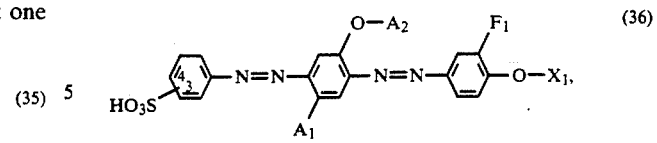 (36)

where $A_1$ is hydrogen or methyl, $F_1$ is hydrogen or methyl and $A_2$ and $X_1$ are each independently of the other hydrogen, methyl, ethyl, $\beta$-hydroxyethyl, $\beta$-hydroxypropyl, $\beta$-hydroxybutyl or $\alpha$-ethyl-$\beta$-hydroxyethyl, and the sulfo group is attached in the 3- or 4-position,

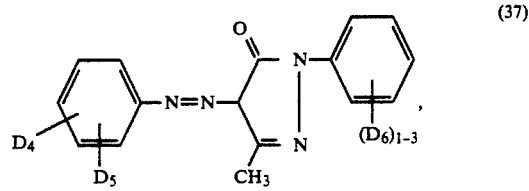 (37)

where $D_4$ is chlorine or phenylaminosulfonyl, $D_5$ is hydrogen or sulfo, $(D_6)_{1-3}$ is 1-3 substituents $D_6$, and $D_6$ is hydrogen, chlorine or sulfo,

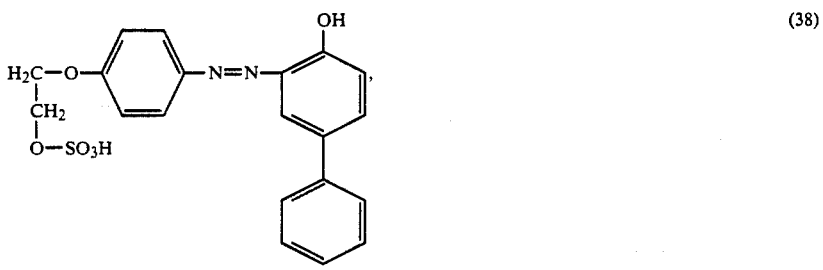 (38)

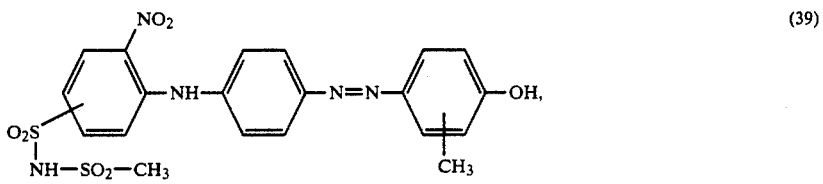 (39)

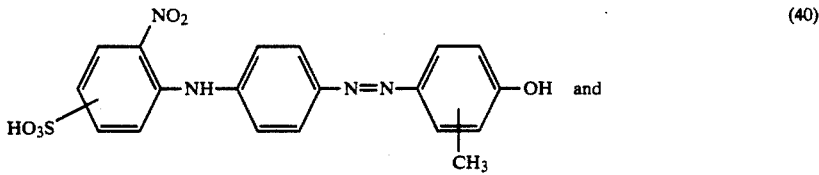 (40)

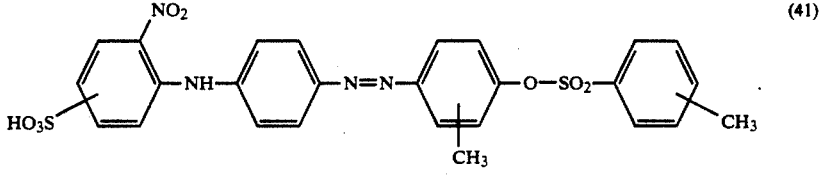 (41)

13. A process for trichromatic dyeing or printing according to claim 9, wherein a dye mixture according to claim 1 is used together with the red-dyeing dye of the formula

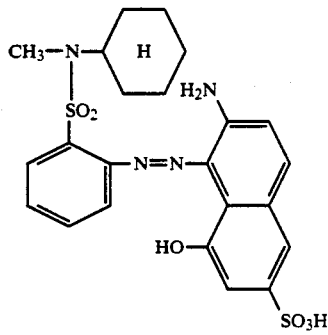

and the yellow-dyeing dye of the formula (29)

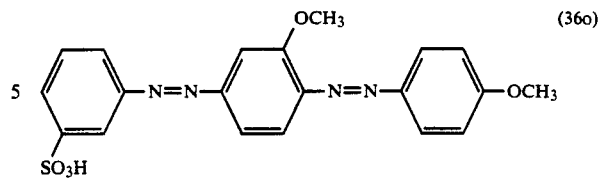  (36o)

or the orange-dyeing dye of the formula

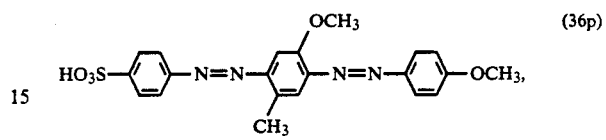  (36p)

14. A dyeing or printing preparation which contains a dye mixture according to claim 1.

15. A natural or synthetic polyamide textile material, dyed or printed according to claim 9.

16. A process for preparing a dye mixture according to claim 1, which comprises reacting 1-amino-4-bromoanthraquinone-2-sulfonic acid with 4,5-dimethyl-3-β-hydroxyethylaminosulfonylaniline and a compound of the formula $NH_2$-R, where R is as defined in claim 1.

* * * * *